(12) United States Patent
Ino et al.

(10) Patent No.: US 11,372,201 B2
(45) Date of Patent: Jun. 28, 2022

(54) OPTICAL SYSTEM AND IMAGING APPARATUS HAVING THE SAME

(71) Applicant: CANON KABUSHIKI KAISHA, Tokyo (JP)

(72) Inventors: Tomohiro Ino, Utsunomiya (JP); Maki Yokoya, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/839,662

(22) Filed: Apr. 3, 2020

(65) Prior Publication Data
US 2020/0326504 A1    Oct. 15, 2020

(30) Foreign Application Priority Data

Apr. 11, 2019 (JP) .............................. JP2019-075406
May 17, 2019 (JP) .............................. JP2019-093546

(51) Int. Cl.
*G02B 9/26* (2006.01)
*G02B 7/04* (2021.01)

(52) U.S. Cl.
CPC .................. *G02B 9/26* (2013.01); *G02B 7/04* (2013.01)

(58) Field of Classification Search
CPC .... G02B 13/0045; G02B 9/62; G02B 13/005; G02B 7/04; G02B 27/646; G02B 13/06; G02B 13/18; G02B 15/00–28; G02B 13/02; G02B 13/04; G02B 9/00–64; G03B 5/00; G03B 13/34; G03B 2205/0007; G03B 2205/0069
USPC ................ 359/749–760, 767–769, 771–772, 359/786–792, 676–695, 745–795
See application file for complete search history.

(56) References Cited

U.S. PATENT DOCUMENTS

| 2013/0194487 A1* | 8/2013 | Eguchi | G02B 13/02 359/784 |
|---|---|---|---|
| 2019/0346660 A1 | 11/2019 | Yokoyama | |
| 2020/0026047 A1* | 1/2020 | Hosoi | G02B 13/02 |

FOREIGN PATENT DOCUMENTS

| CN | 110488455 A | 11/2019 |
| JP | 2012002999 A | 1/2012 |
| JP | 2012189679 A | 10/2012 |
| JP | 2012242504 A | 12/2012 |
| JP | 2014211496 A | 11/2014 |

(Continued)

OTHER PUBLICATIONS

Notification of the First Office Action issued by the China National Intellectual Property Administration dated Nov. 17, 2021 in corresponding CN Patent Application No. 202010263252.9, with English translation.

*Primary Examiner* — Marin Pichler
*Assistant Examiner* — Alberto J Betancourt
(74) *Attorney, Agent, or Firm* — Carter, DeLuca & Farrell LLP

(57) ABSTRACT

An optical system consists of, in order from an object side to an image side, a first lens unit having a positive refractive power, a second lens unit having a positive refractive power, a third lens unit having a negative refractive power. A distance between adjacent lens units changes during focusing. The second lens unit moves during the focusing. The following conditional expression is satisfied:

$$-0.20 < f3/f < -0.05$$

where f is a focal length of the optical system focused on an object at infinity and f3 is a focal length of the third lens unit.

19 Claims, 16 Drawing Sheets

(56) References Cited

FOREIGN PATENT DOCUMENTS

| JP | 2018018101 A | 2/2018 |
|---|---|---|
| WO | 2018088038 A1 | 5/2018 |

* cited by examiner

OPTICAL SYSTEM AND IMAGING APPARATUS HAVING THE SAME

BACKGROUND OF THE INVENTION

Field of the Invention

The present invention relates to an optical system suitable for a digital video camera, a digital still camera, a broadcast camera, a silver-halide film camera, a monitoring camera, and the like.

Description of the Related Art

Conventionally, an optical system has performed focusing by moving the entire optical system or moving part of lenses in the optical system. When an optical system is a telephoto lens having a long focal length, the lens is large and heavy, making it difficult to perform focusing by moving the entire optical system. Thus, the telephoto lens uses a so-called inner focus method in which focusing is performed by moving a relatively small and light lens unit other than a heavy front lens unit. The telephoto lens using the inner focus method includes three lens units of, in order from an object side to an image side, a first lens unit having a positive refractive power, a second lens unit having a positive or negative refractive power, and a third lens unit having a positive or negative refractive power, and performs focusing using the second lens unit.

Conventionally, an optical system has been proposed where the optical system drives part or all of lenses in a direction orthogonal to an optical axis in order to correct image blurs caused by a shake (namely, perform image stabilization). When the optical system is the telephoto lens having the long focal length, the lens is large and heavy. Thus, the optical system uses a method that drives all or part of a relatively small and light rear lens unit in the direction orthogonal to the optical axis to perform the image stabilization.

Japanese Patent Laid-Open No. ("JP") 2012-242504 discloses a telephoto lens that includes, in order from an object side to an image side, a first lens unit having a positive refractive power, a second lens unit having a positive refractive power, and a third lens unit having a negative refractive power, and performs the image stabilization using a middle group in the third lens unit.

JP 2014-211496 discloses a telephoto lens that includes, in order from an object side to an image side, a first lens unit having a positive refractive power, a second lens unit having a negative refractive power, and a third lens unit having a positive refractive power, and performs the image stabilization using a middle group in the third lens unit.

The optical system using the inner focus method can perform high-speed focusing by moving a small and light lens unit, but its optical performance is likely to vary since height of a light ray entering a focus lens unit greatly varies during a movement of the focus lens unit. In particular, in a telephoto lens that includes, in order from an object side to an image side, a first lens unit having a positive refractive power and a second lens unit having a negative refractive power, and performs focusing using the second lens unit, an aberration in a second lens unit is configured to cancel a spherical aberration, a coma, and the like that occur in the first lens unit. Thus, it is necessary to generate a large aberration in the second lens unit, and a deterioration in the optical performance increases during focusing. A variation in the optical performance caused by decentering also increases, making it difficult to manufacture an optical system having high optical performance.

In addition, it is necessary to properly arrange the refractive power of each lens in order to obtain fine image stabilizing performance while reducing the weight that is likely to increase in the telephoto lens and reducing an overall lens length of the optical system.

Neither JP 2012-242504 nor JP 2014-211496 discloses a method for reducing the overall lens length while reducing the deterioration in the optical performance during focusing, with the small number of lenses so as to reduce the weight of the optical system.

SUMMARY OF THE INVENTION

The present invention provides a light and small optical system that can reduce a variation in optical performance due to focusing, and an imaging apparatus having the same.

An optical system according to one aspect of the present invention consists of, in order from an object side to an image side, a first lens unit having a positive refractive power, a second lens unit having a positive refractive power, a third lens unit having a negative refractive power. A distance between adjacent lens units changes during focusing. The second lens unit moves during the focusing. The following conditional expression is satisfied:

$$-0.20 < f3/f < -0.05$$

where f is a focal length of the optical system focused on an object at infinity and f3 is a focal length of the third lens unit.

An imaging apparatus including the above optical system also constitute another aspect of the present invention.

Further features of the present invention will become apparent from the following description of exemplary embodiments with reference to the attached drawings.

DESCRIPTION OF THE EMBODIMENTS

Figure 1:
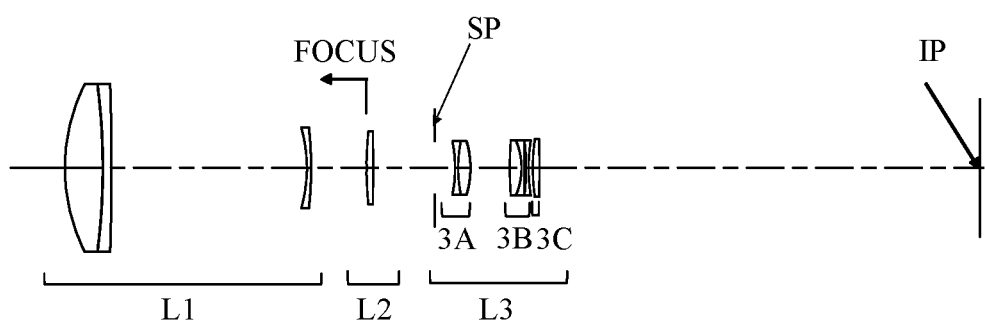
FIG. 1 illustrates a sectional view of an optical system focused on an object at infinity according to Example 1.
Figure 2A:
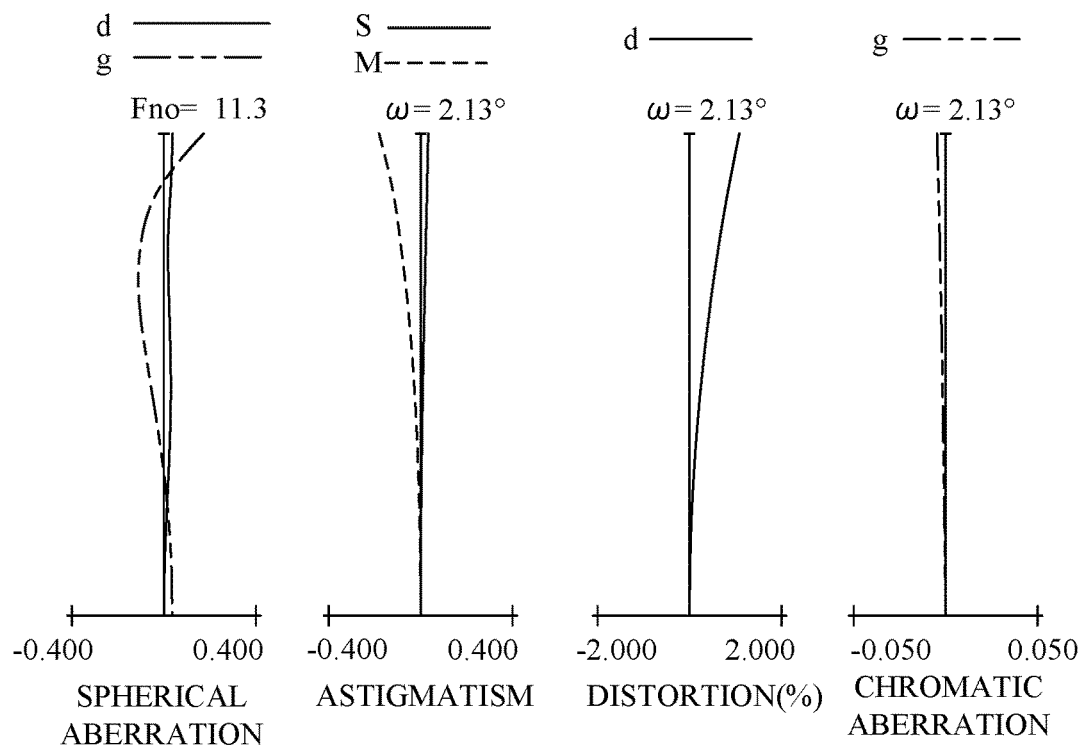
FIGS. 2A and 2B are aberration diagrams of the optical system focused on the object at infinity and on an object at a distance of 4.5 m according to Example 1.
Figure 2B:
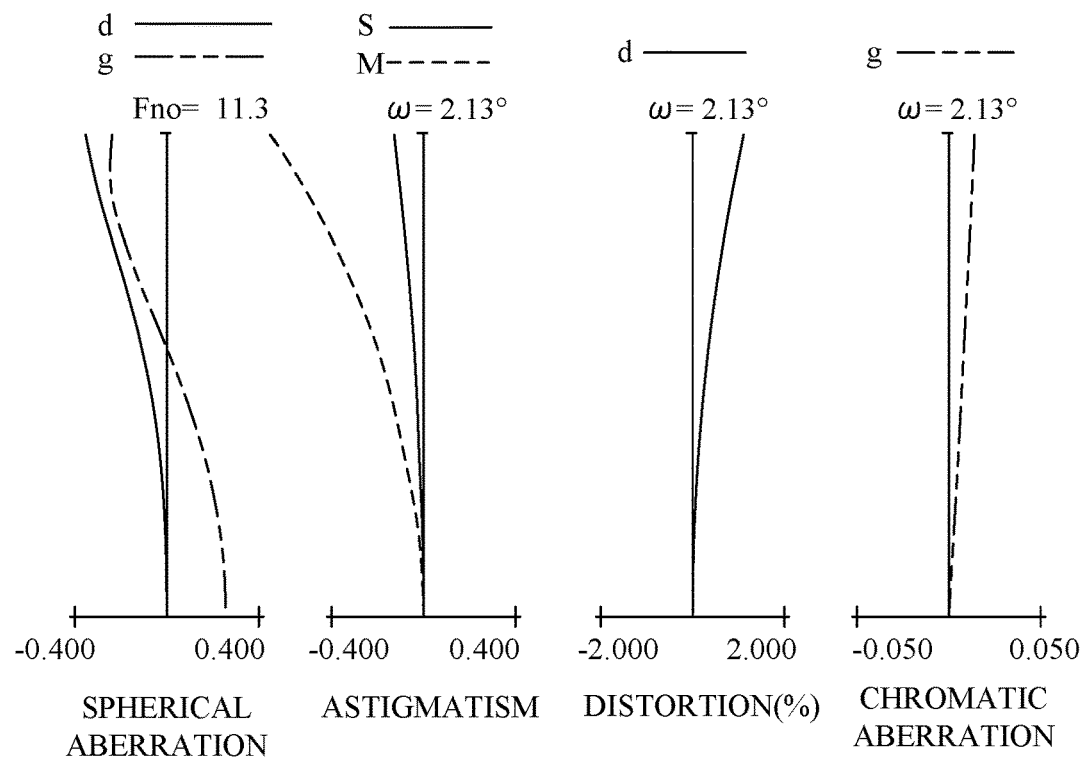
Figure 3:
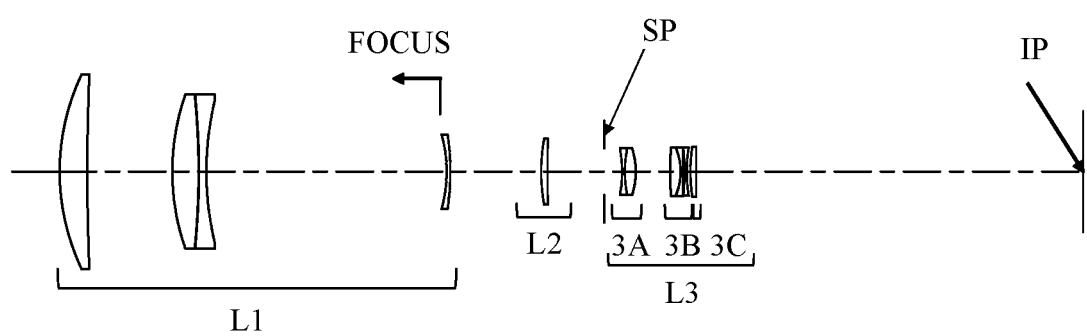
FIG. 3 illustrates a sectional view of an optical system focused on an object at infinity according to Example 2.
Figure 4A:
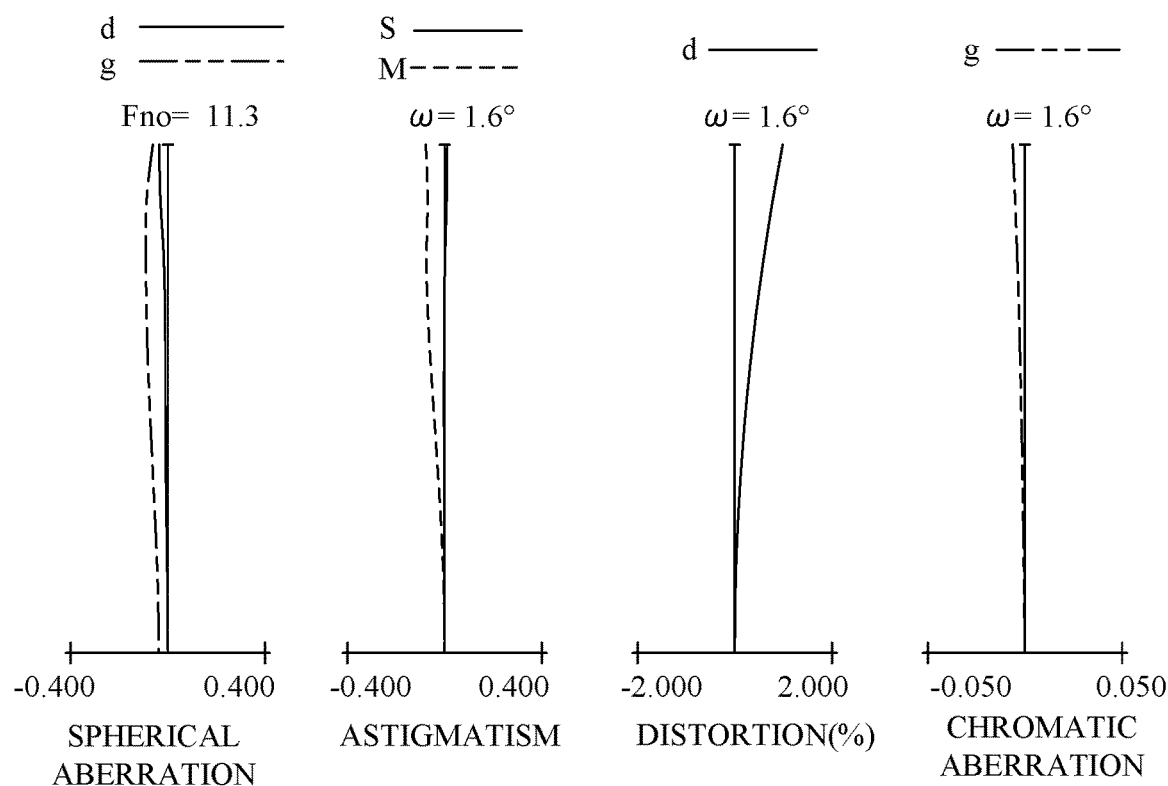
FIGS. 4A and 4B are aberration diagrams of the optical system focused on the object at infinity and on an object at a distance of 6 m according to Example 2.
Figure 4B:
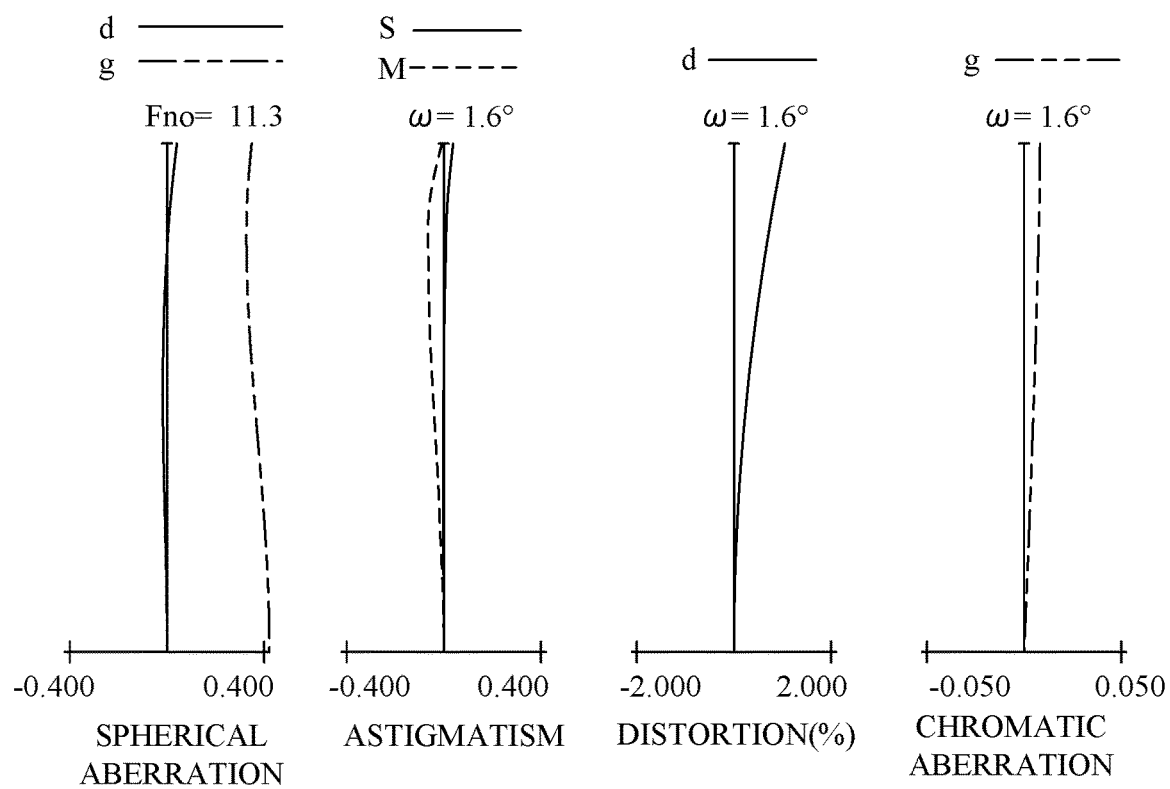
Figure 5:
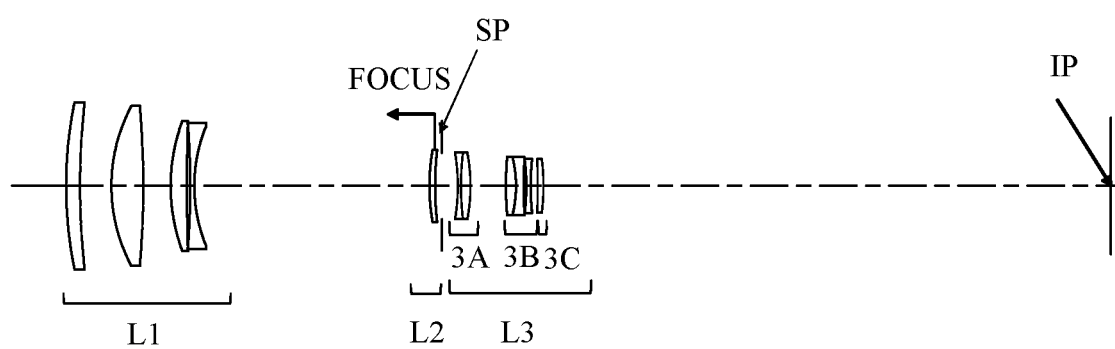
FIG. 5 illustrates a sectional view of an optical system focused on an object at infinity according to Example 3.
Figure 6A:
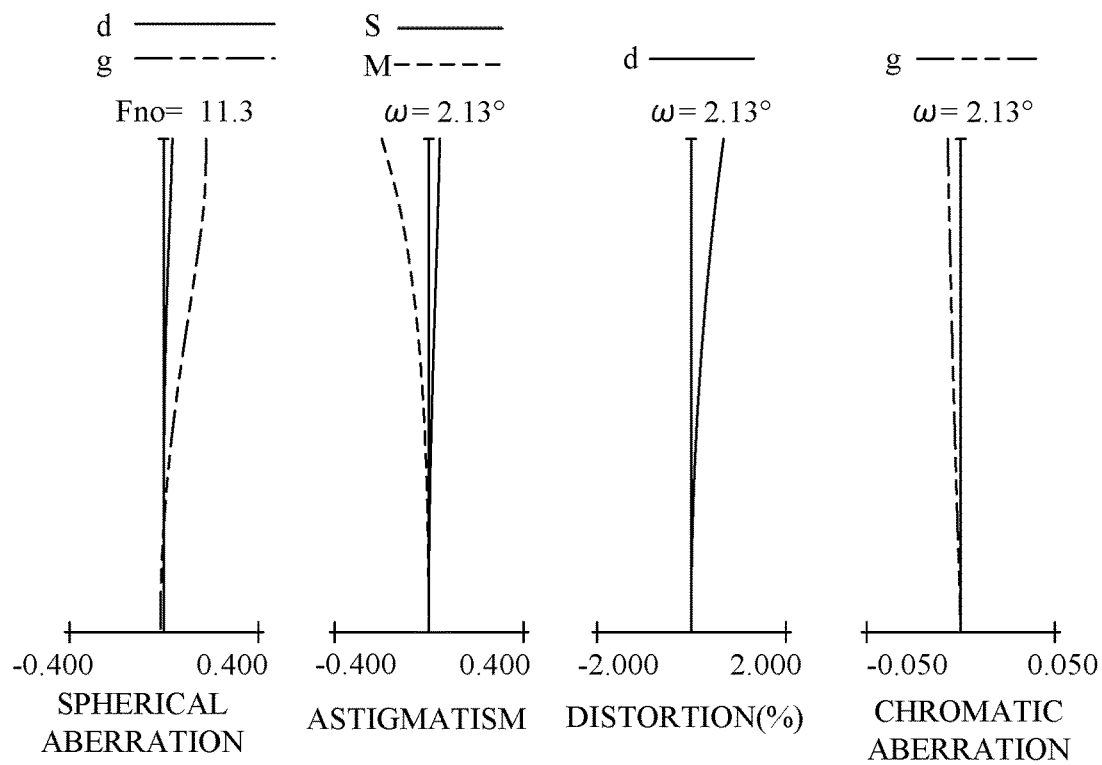
FIGS. 6A and 6B are aberration diagrams of the optical system focused on the object at infinity and on an object at a distance of 4.5 m according to Example 3.
Figure 6B:
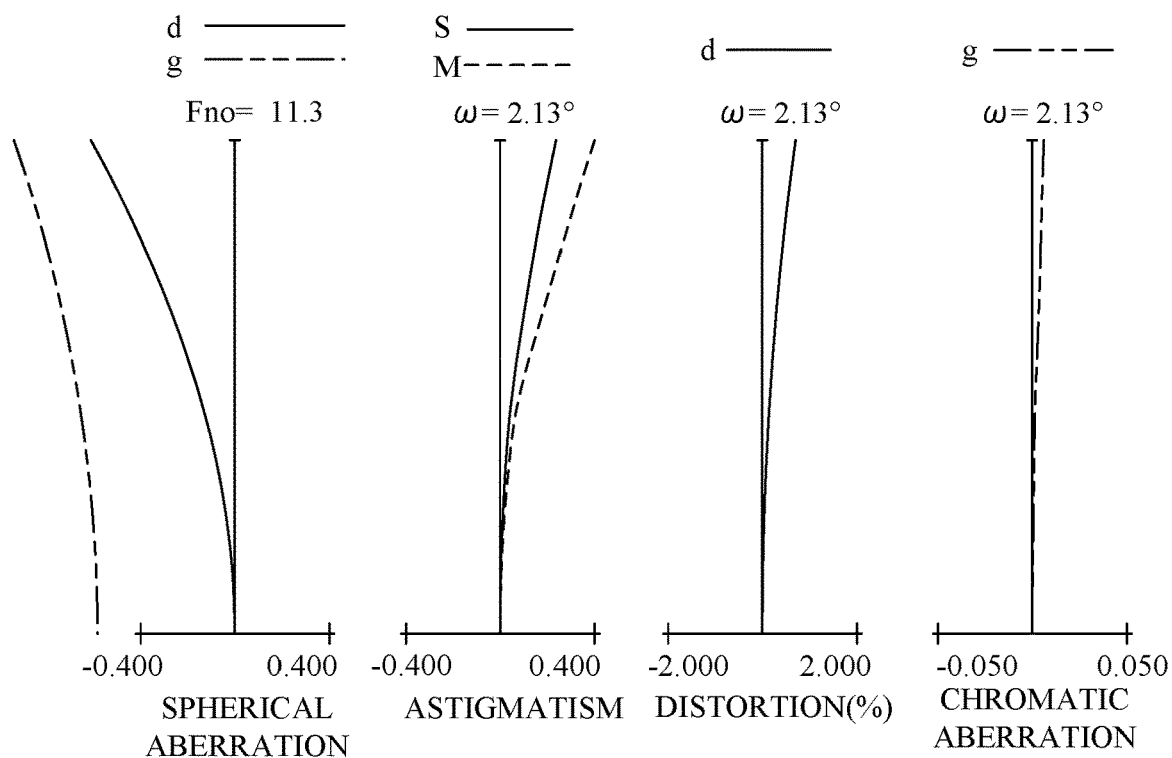
Figure 7:
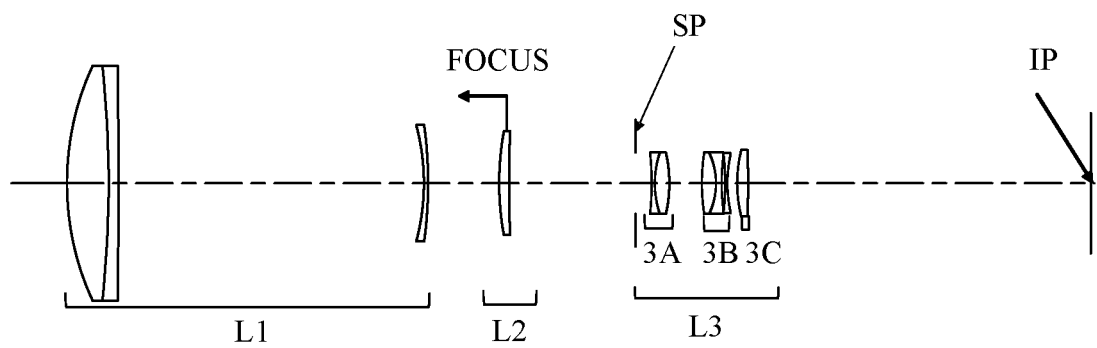
FIG. 7 illustrates a sectional view of an optical system focused on an object at infinity according to Example 4.
Figure 8A:
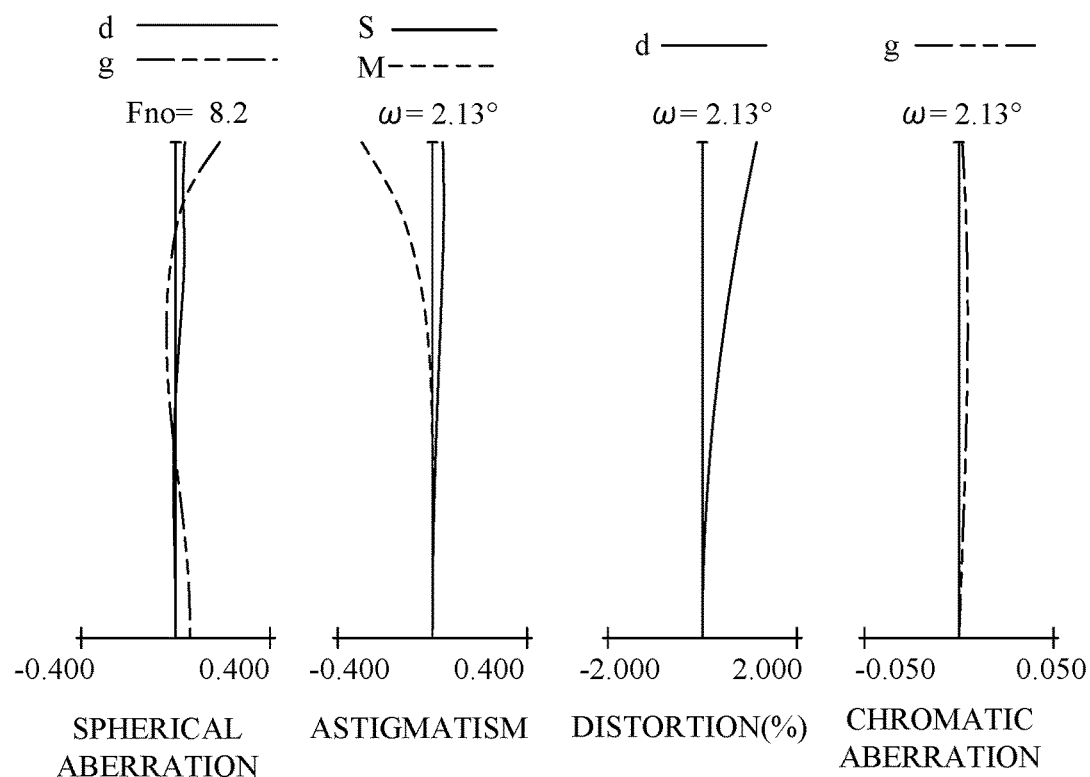
FIGS. 8A and 8B are aberration diagrams of the optical system focused on the object at infinity and on an object at a distance of 4.5 m according to Example 4.
Figure 8B:
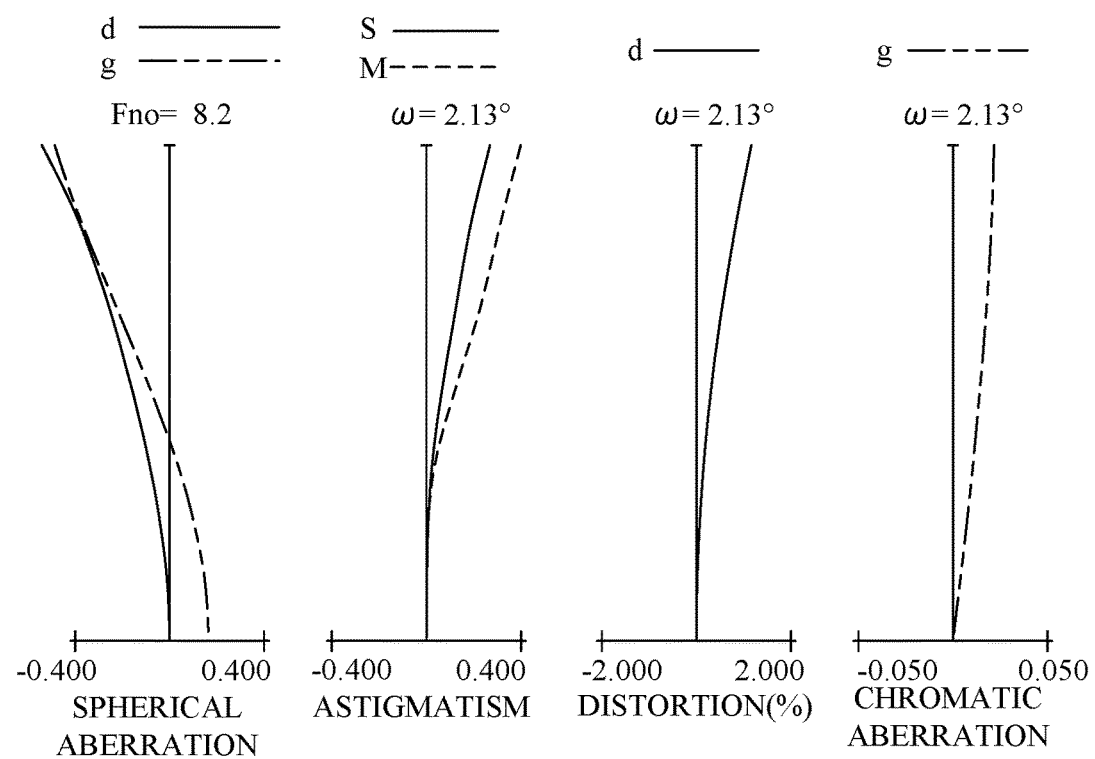
Figure 9A:
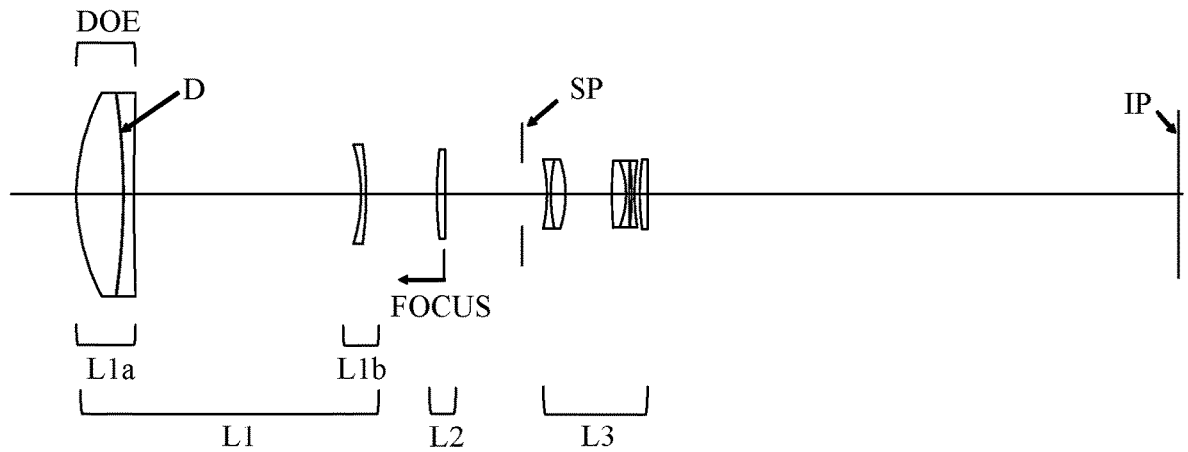
FIGS. 9A and 9B illustrate a sectional view and an aberration diagram of an optical system focused on an object at infinity according to Example 5.
Figure 9B:
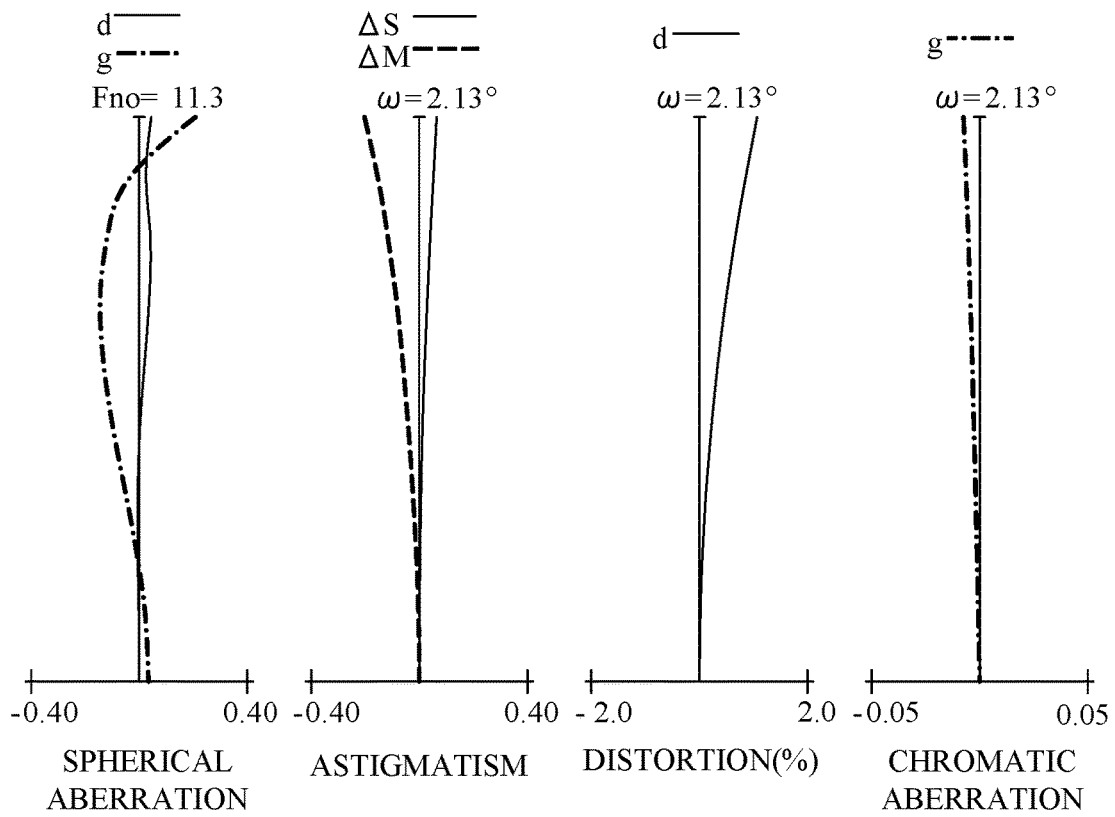
Figure 10A:
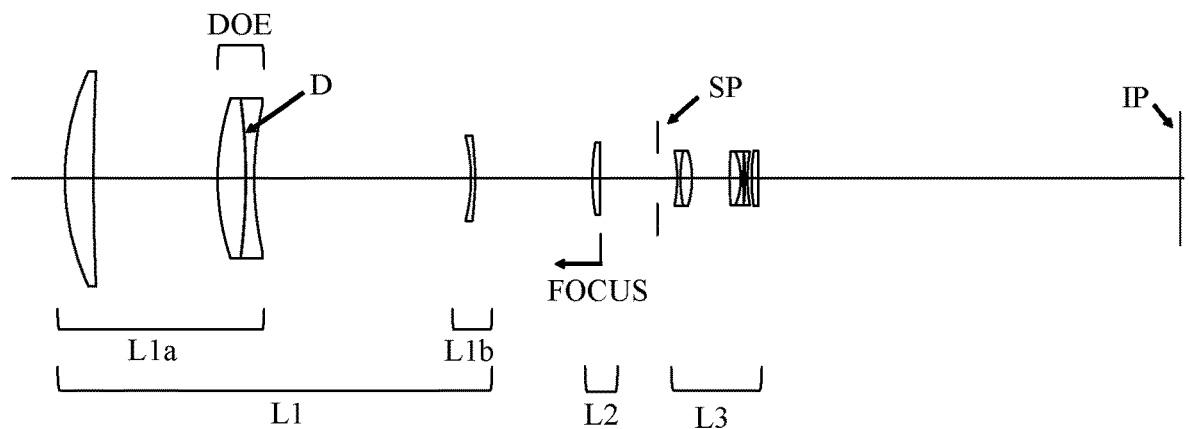
FIGS. 10A and 10B illustrate a sectional view and an aberration diagram of an optical system focused on an object at infinity according to Example 6.
Figure 10B:
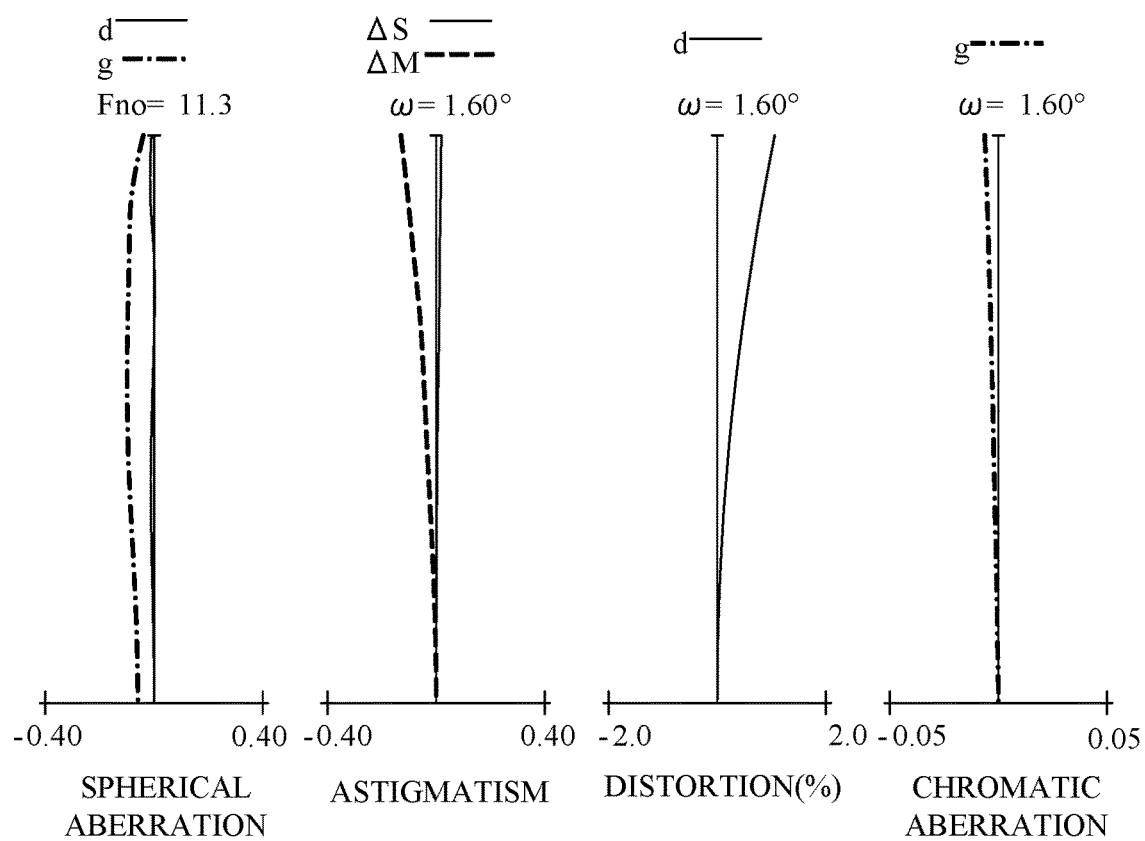
Figure 11A:
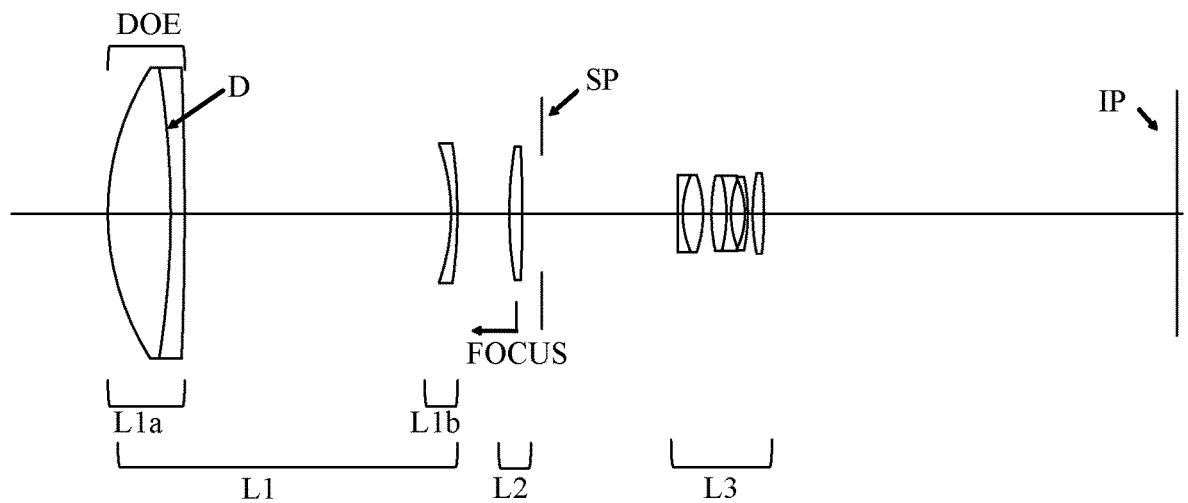
FIGS. 11A and 11B illustrate a sectional view and an aberration diagram of an optical system focused on an object at infinity according to Example 7.
Figure 11B:
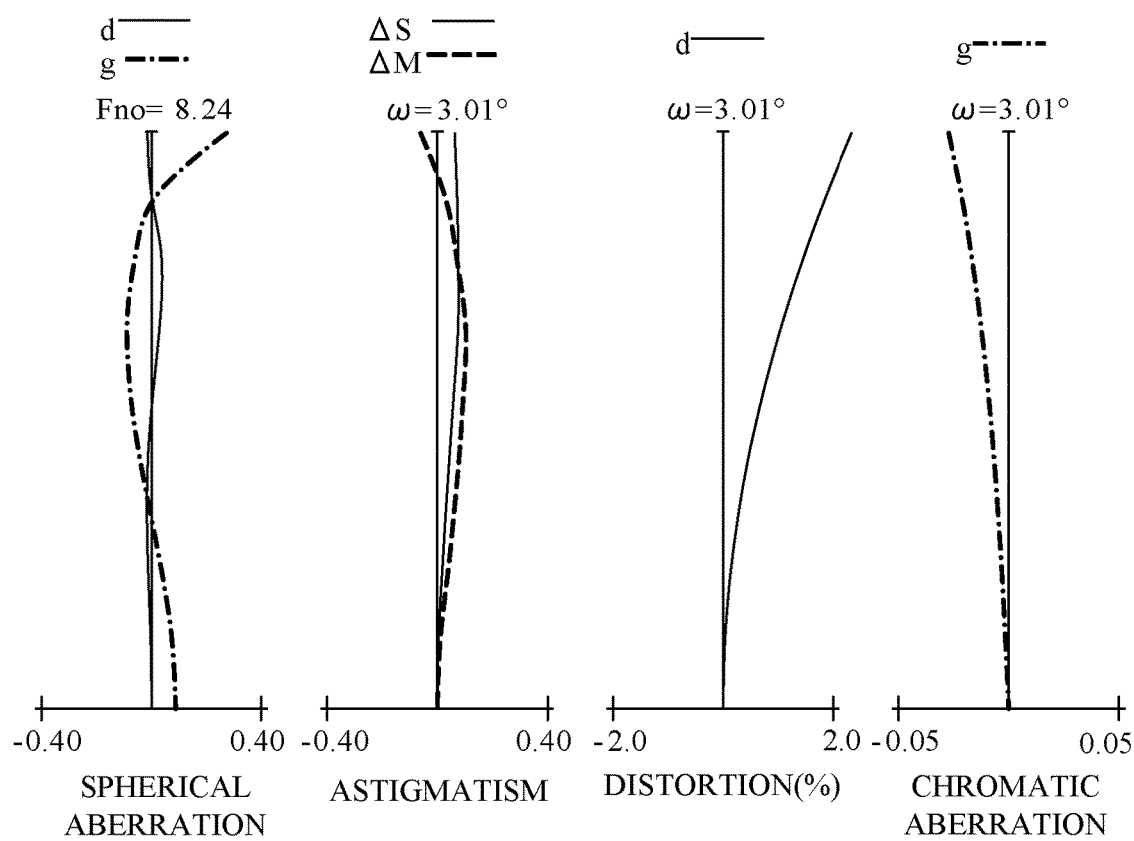
Figure 12A:
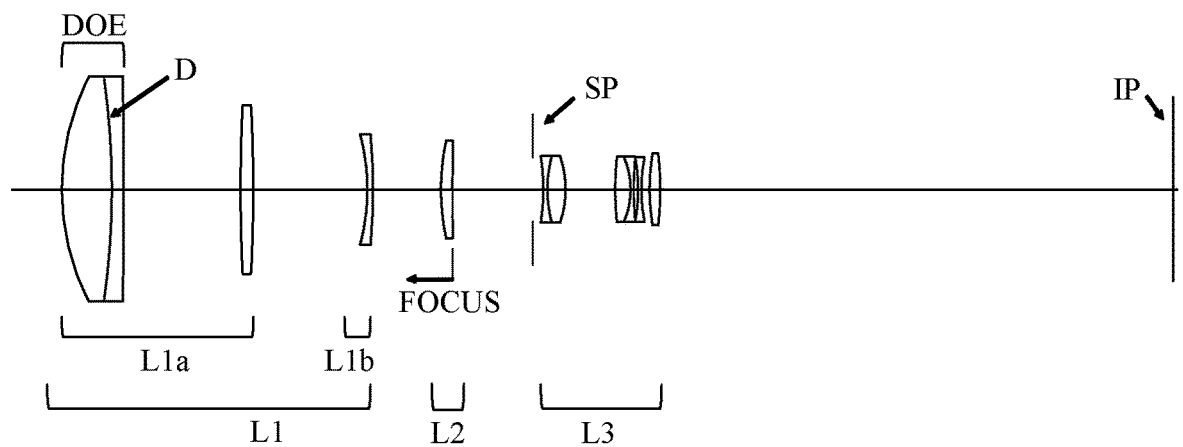
FIGS. 12A and 12B illustrate a sectional view and an aberration diagram of an optical system focused on an object at infinity according to Example 8.
Figure 12B:
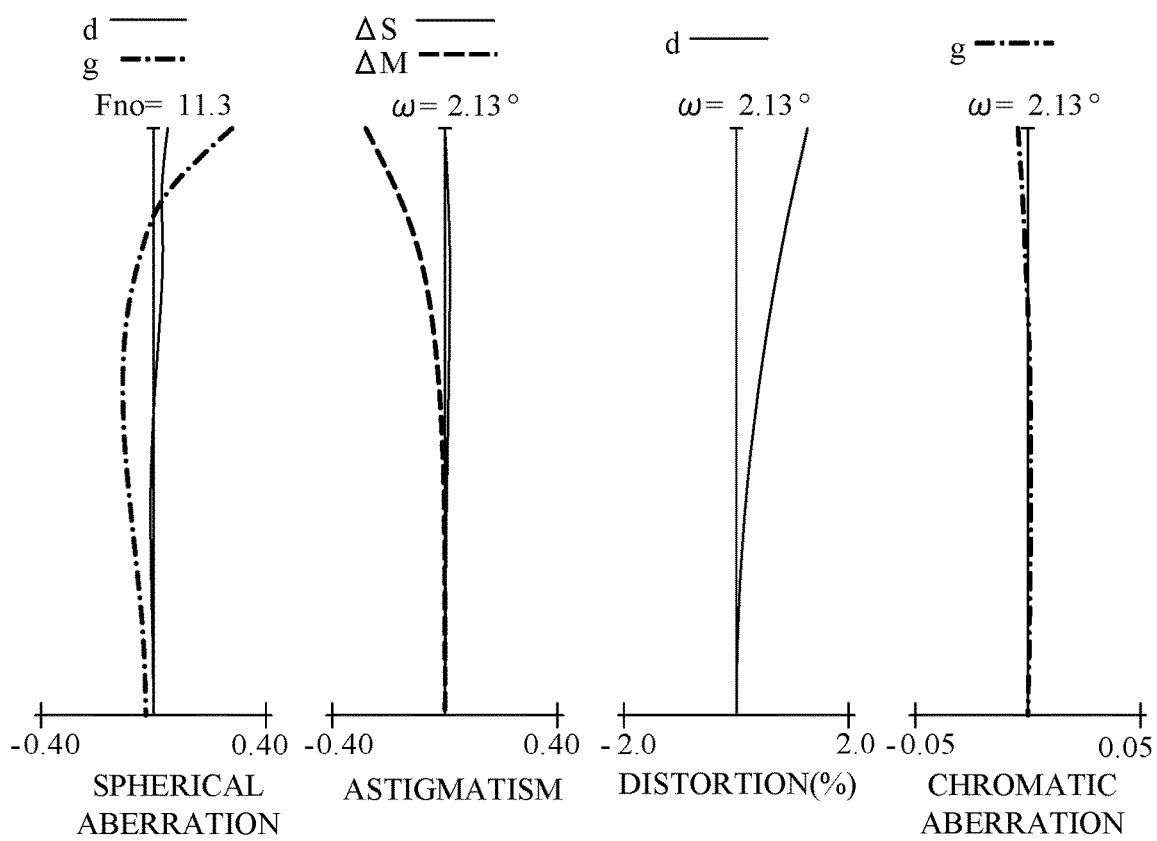
Figure 13A:
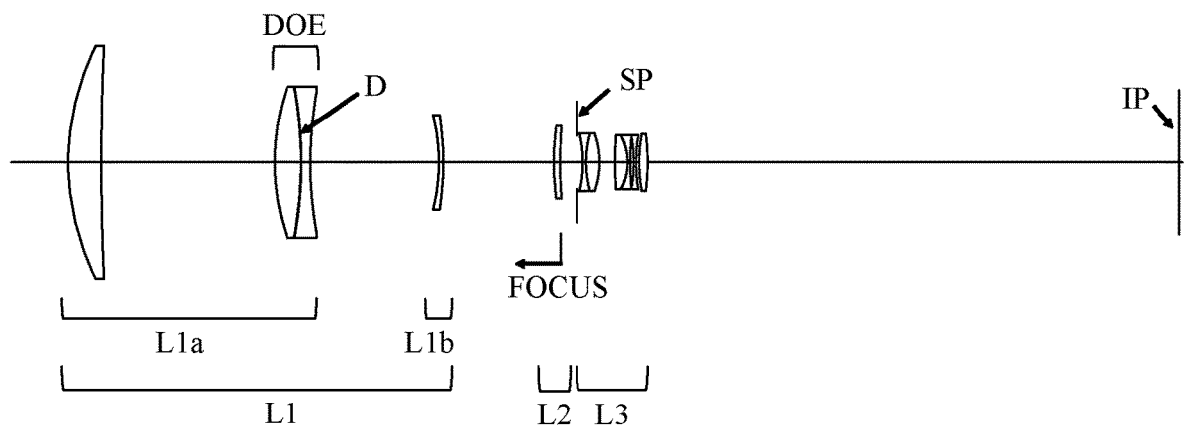
FIGS. 13A and 13B illustrate a sectional view and an aberration diagram of an optical system focused on an object at infinity according to Example 9.
Figure 13B:
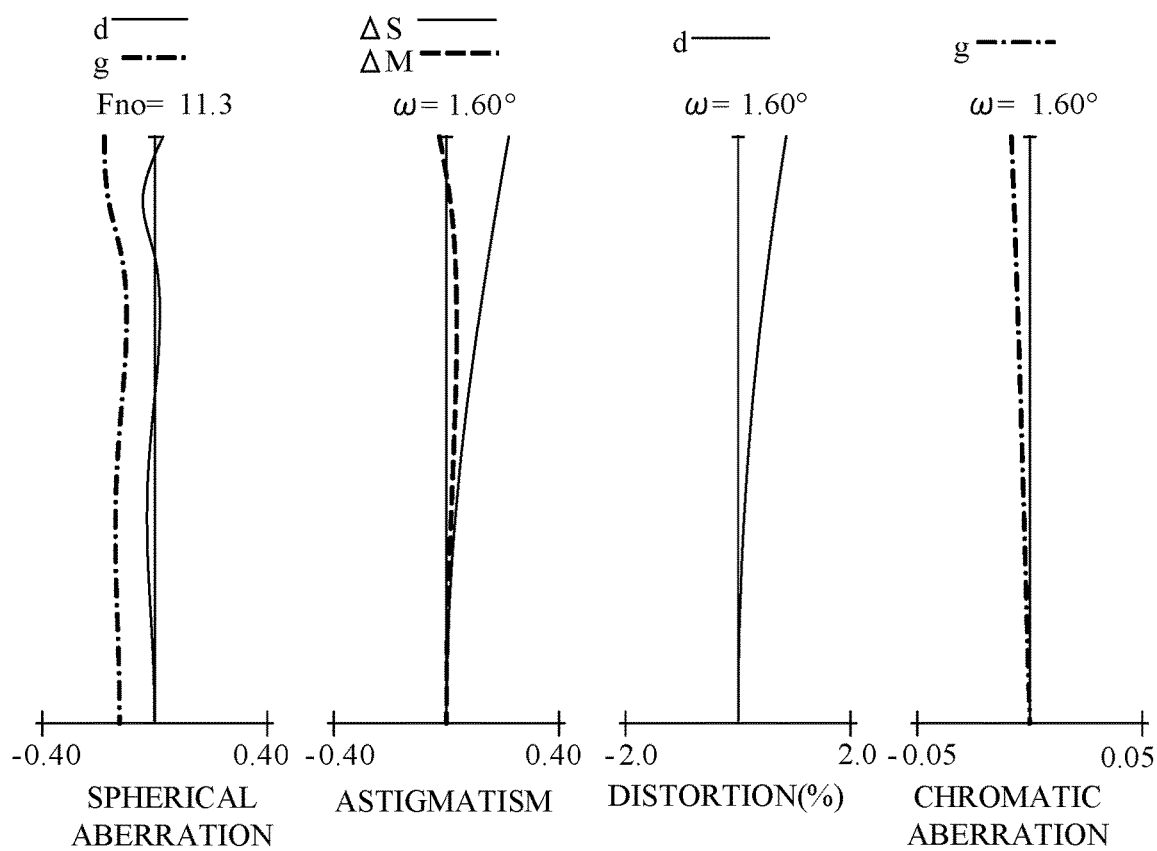
Figure 14A:
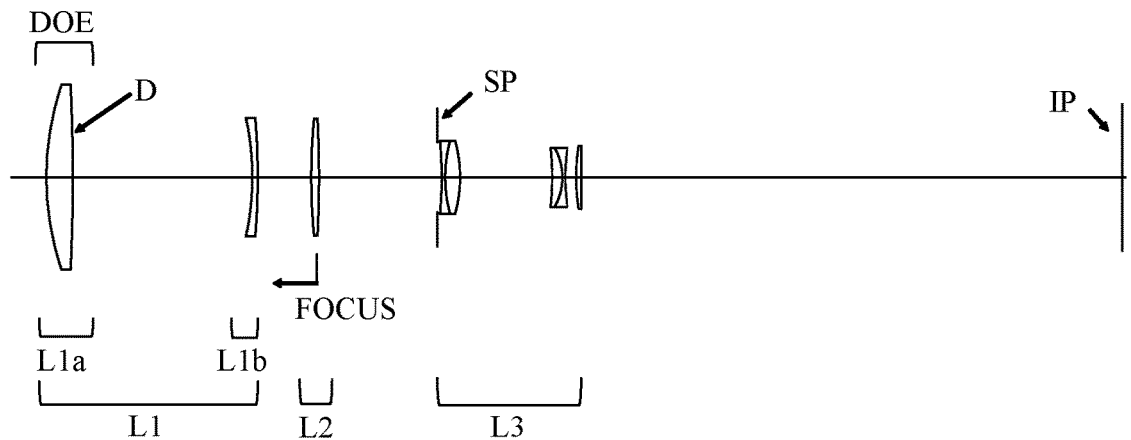
FIGS. 14A and 14B illustrate a sectional view and an aberration diagram of an optical system focused on an object at infinity according to Example 10.
Figure 14B:
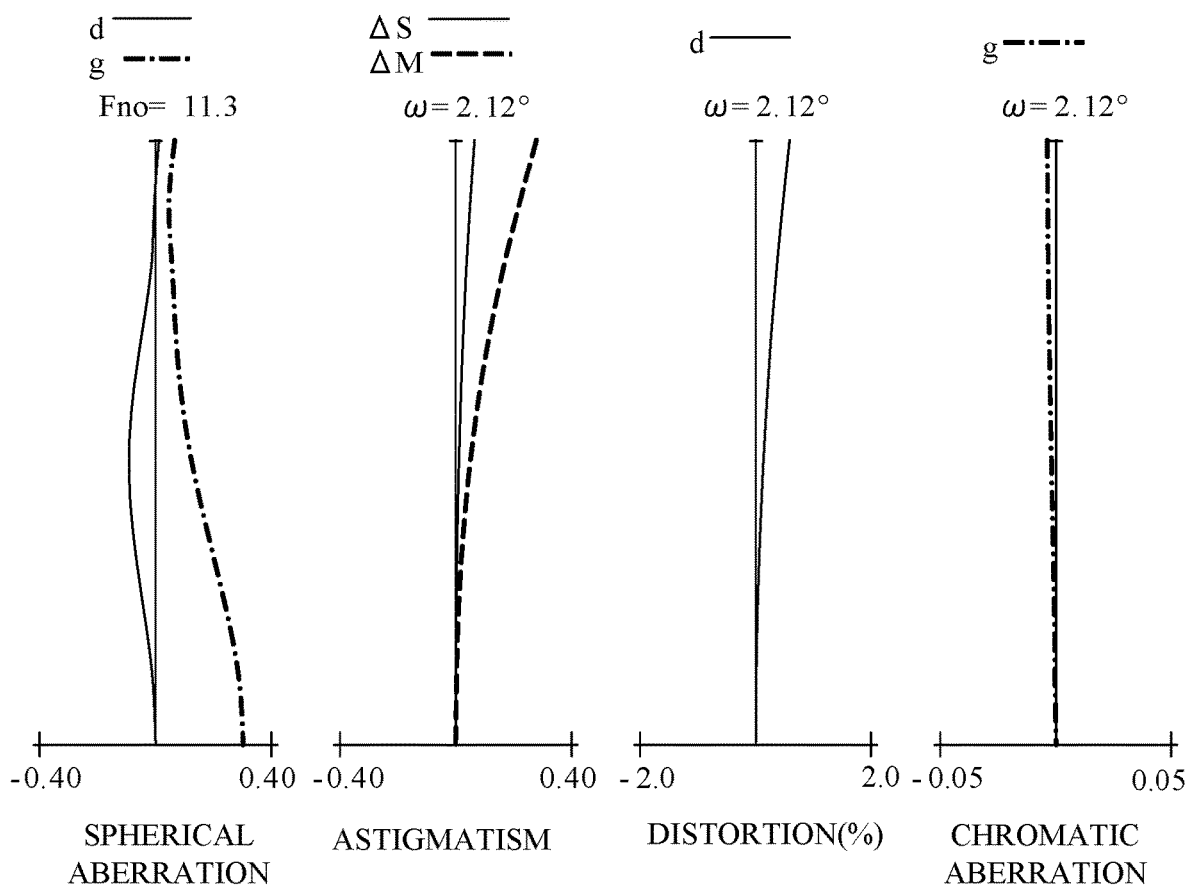
Figure 15A:
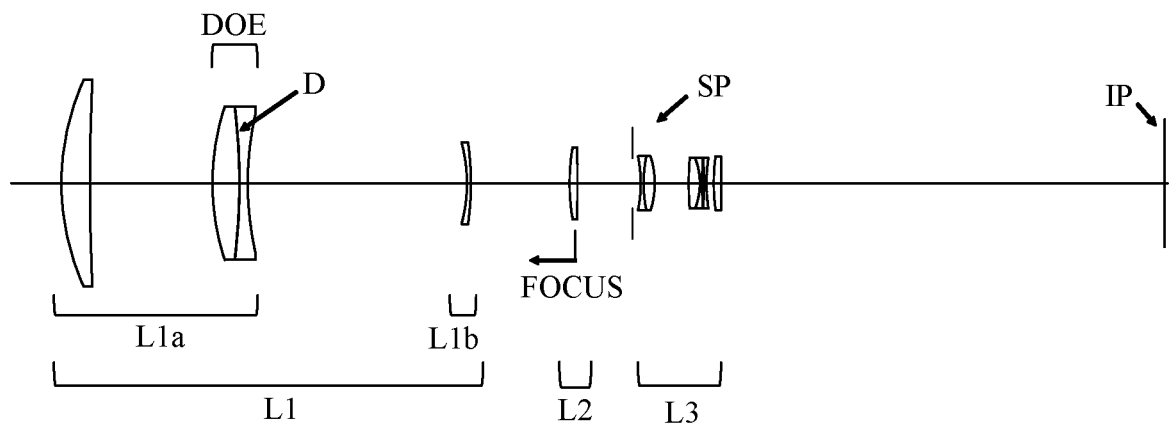
FIGS. 15A and 15B illustrate a sectional view and an aberration diagram of an optical system focused on an object at infinity according to Example 11.
Figure 15B:
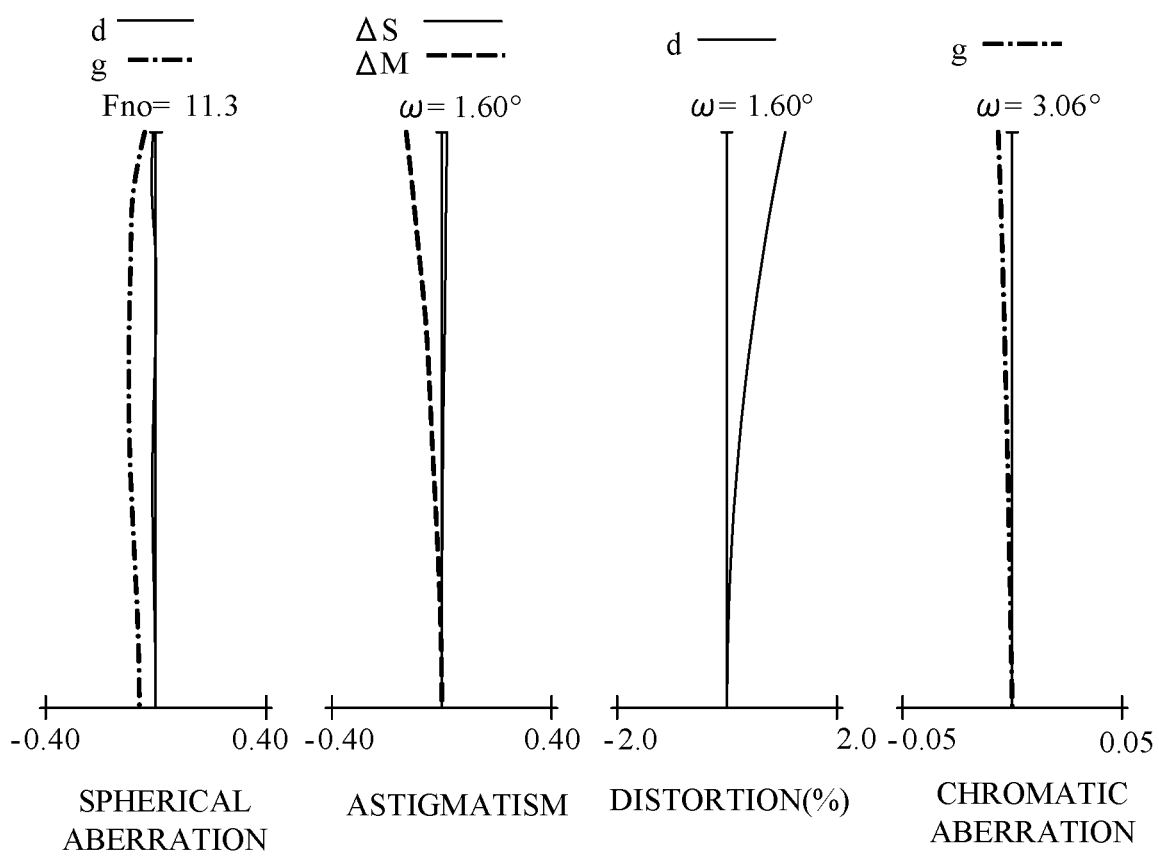

Referring now to the accompanying drawings, a detailed description will be given of examples according to the present invention. Corresponding elements in respective figures will be designated by the same reference numerals, and a duplicate description thereof will be omitted.

Each of FIGS. 1, 3, 5, and 7 illustrates a sectional view of an optical system (lenses) focused on an object at infinity according to Examples 1 to 4, respectively. Each of FIGS. 2A and 2B, 4A and 4B, 6A and 6B, and 8A and 8B are aberration diagrams of the optical system focused on an object at infinity and on an object at a distance of 4.5 m according to each of Examples 1 to 4, respectively. The optical system of Example 1 has a focal length of 582 mm and an F-number of 11.3. The optical system of Example 2 has a focal length of 776 mm and an F-number of 11.3. The optical system of Example 3 has a focal length of 582 mm and an F-number of 11.3. The optical system of Example 4 has a focal length of 582 mm and an F-number of 8.2.

Each of FIGS. 9A and 9B to 15A and 15B are a sectional view and an aberration diagram of an optical system focused on an object at infinity in each of Examples 5 to 11, respectively. The optical system of Example 5 has a focal length of 582 mm and an F-number of 11.3. The optical system of Example 6 has a focal length of 776 mm and an F-number of 11.3. The optical system of Example 7 has a focal length of 412 mm and an F-number of 8.2. The optical system of Example 8 has a focal length of 582 mm and an F-number of 11.3. The optical system of Example 9 has a focal length of 776 mm and an F-number of 11.3. The optical system of Example 10 has a focal length of 585 mm and an F-number of 11.3. The optical system of Example 11 has a focal length of 776 mm and an F-number of 11.3.

The optical system in each example is used for an imaging apparatus such as a digital video camera, a digital still camera, a broadcast camera, a silver-halide film camera, and a monitoring camera. An optical system of each numerical example can be used as a projection optical system for a projecting apparatus (projector).

In each sectional view, a left side is an object side (front), and a right side is an image side (rear). The optical system in each example includes a plurality of lens units. In this specification of the present application, a lens unit includes lenses or a lens, and in a lens unit, each lens integrally moves during focusing. That is, in the optical system in each example, a distance between adjacent lens units changes during focusing from an object at the infinity to a close object. A lens unit may include a single lens, or may include a plurality of lenses. Also, a lens unit may include an aperture stop.

In each sectional view, when i is an order of a lens unit from the object side, Li represents an i-th lens unit. SP represents an aperture stop. IP represents an image plane. When the optical system of each example is used in a digital still camera or a digital video camera, the image plane IP is an imaging plane of a solid image sensor (photoelectric conversion element) such as a CCD sensor or a CMOS sensor. When the optical system of each example is used in a silver-halide film camera, the image plane IP is a photosensitive surface corresponding to a film surface. On the object side of the image plane IP, an optical block corresponding to an optical filter, a face plate, a low-pass filter, an infrared cut filter, or the like may be disposed.

In a spherical aberration diagram, Fno is an F-number, and represents an amount of a spherical aberration with respect to the d-line (wavelength 587.6 nm) and the g-line (wavelength 435.8 nm). In an astigmatism diagram, S represents an astigmatism amount on a sagittal image plane for the d-line, and M represents an astigmatism amount on a meridional image plane for the d-line. A distortion diagram represents a distortion amount of for the d-line. A chromatic aberration diagram represents a chromatic aberration amount for the g-line. ω represents a half angle of view.

An optical system of the present invention includes, in order from the object side to the image side, a first lens unit L1 having a positive refractive power, a second lens unit L2 having a positive refractive power, and a third lens unit L3 having a negative refractive power. An aperture stop SP is provided between the second lens unit L2 and the third lens unit L3. By moving the second lens unit L2 to the object side, the optical system performs focusing from an object at infinity to a close object.

The optical system of the present invention reduces the overall lens length (overall optical length) by using a telephoto type refractive power arrangement that includes a front group having a positive refractive power composed of the first lens unit L1 having the positive refractive power and the second lens unit L2 having the positive refractive power, and a rear group composed of the third lens unit L3 having the negative refractive power.

The optical system of the present invention can particularly suppress generation of high order aberration by making the second lens unit L2 having the positive refractive power share the refractive power of the first lens unit L1 in which a paraxial marginal ray is high, and spherical aberration, coma, on-axis chromatic aberration, and the like are largely generated.

The present invention can reduce a variation in optical performance caused by decentering, and can improve easiness in manufacturing.

In the optical system of the present invention, the refractive power of the first lens unit L1 is smaller than that in a negative refractive power arrangement in which a second lens unit has a negative refractive power, making it possible to reduce an incident angle of a light ray entering the second lens unit L2, which is the focus lens unit. Thus, the present invention can reduce a variation in height of the light ray entering the second lens unit L2 during focusing, making it possible to reduce the variation in the optical performance during focusing.

In the optical system of the present invention, a lens closest to the image side in the first lens unit L1 is a negative lens. By disposing a lens having a negative refractive power on the object side of the focus lens unit, the present invention can further reduce the incident angle of the light ray entering the focus lens unit and the variation in the optical performance during focusing.

The optical system of the present invention can use the telephoto type arrangement for an arrangement of the refractive power in the first lens unit L1, and thus it is possible reduce the size of the lens.

The optical system of the present invention satisfies the following conditional expression (1):

$$-0.32 < f3/f < -0.05 \quad (1)$$

where f is a focal length of the optical system focused on an object at infinity, and f3 is a focal length of the third lens unit L3.

The conditional expression (1) is for reducing the overall lens length while ensuring fine optical performance. If the refractive power of the third lens unit L3 is so large that the value is higher than the upper limit of the conditional expression (1), an effect of the telephoto type refractive power arrangement asymmetric for the aperture stop SP is too strong, enhancing off-axis aberration such as field curvature and distortion. On the other hand, if the refractive power of the third lens unit L3 is so small that the value is lower than the lower limit of the conditional expression (1), the effect of the telephoto type refractive power arrangement decreases, and the overall lens length increases.

In each numerical example, the third lens unit L3 includes, in order from the object side to the image side, a first partial unit 3A having a negative refractive power, a second partial unit 3B having a negative refractive power, and a third partial unit 3C having a positive refractive power. During image stabilization (blur correction), the second partial unit 3B moves in a direction including a component orthogonal to the optical axis.

Since the first partial unit 3A has the negative refractive power, a front principal point of the third lens unit L3 is at the object side, making it possible to reduce the overall lens length.

The optical system of the present invention may satisfy the following conditional expression (2):

$$0.01 < D3A/f < 0.05 \quad (2)$$

where D3A is an air distance on the optical axis between the first partial unit 3A and the second partial unit 3B.

The conditional expression (2) is for reducing the overall lens length while properly maintaining a sensitivity in the image stabilization. If the air distance D3A on the optical axis between the first partial unit 3A and the second partial unit 3B is so long that the value is higher than the upper limit of the conditional expression (2), the overall lens length increases. This case reduces a distance between the third partial unit 3C and the image plane and a lateral magnification of the third partial unit 3C, as a result, the sensitivity in the image stabilization decreases. In addition, since the second partial unit 3B is disposed rearward, a lens diameter becomes large so as to obtain a peripheral light flux and thus lens weight increases, making it difficult to drive at the time of the image stabilization. On the other hand, if the air distance D3A on the optical axis between the first partial unit 3A and the second partial unit 3B is so short that the value is lower than the lower limit of the conditional expression (2), the distance between the third lens unit L3 and the image plane increases, and the lateral magnification of the third partial unit 3C increases. As a result, the sensitivity in the image stabilization is so high that the second partial unit 3B moves minutely in response to a minute vibration such as a shutter shock at a time of imaging, causing image blur.

The optical system of the present invention may satisfy the following conditional expression (3):

$$-0.30 < f3B/f < -0.05 \quad (3)$$

where f3B is a focal length of the second partial unit 3B.

The conditional expression (3) is for reducing the overall lens length while properly setting the sensitivity in the image stabilization. If the refractive power of the second partial unit 3B is so small that the value is higher than the upper limit of the conditional expression (3), it is necessary to largely move the lens in the optical axis direction during the image stabilization. Thus, the size of a lens driving mechanism increases, and the size of the optical system increases. On the other hand, if the refractive power of the second partial unit 3B is so large that the value is lower than the lower limit of the conditional expression (3), the third lens unit L3 cannot completely correct various aberrations, and in particular, astigmatism increases.

The optical system of the present invention may satisfy the following conditional expression (4):

$$0.40 < L/f < 0.70 \quad (4)$$

where L is the overall lens length of the optical system focused on an object at infinity.

The conditional expression (4) is for reducing the overall lens length while ensuring the fine optical performance. If the overall lens length is so long that the value is higher than the upper limit of the conditional expression (4), the size of the optical system increases. On the other hand, if the overall lens length is so small that the value is lower than the lower limit of the conditional expression (4), the first lens unit L1 increases generation of the spherical aberration, coma, on-axis chromatic aberration, and lateral chromatic aberration too much to sufficiently correct each aberration, making it difficult to ensure high optical performance. In this case, in order to ensure the high optical performance, it is necessary to increase the number of lenses in the first lens unit L1, making it impossible to reduce the weight.

Further, the optical system of the present invention may satisfy the following conditional expression (5).

$$-1.20 < f3A/f < -0.20 \quad (5)$$

where f3A is a focal length of the first partial unit 3A.

The conditional expression (5) is for reducing the overall lens length while ensuring the fine optical image performance. If the power of the first partial unit 3A is so large that the value is higher than the upper limit of the conditional expression (5), the field curvature increases, and thus the optical performance decreases. On the other hand, if the power of the first partial unit 3A is so small that the value is lower than the lower limit of the conditional expression (5), the effect of the telephoto type arrangement decreases, making it difficult to reduce the overall lens length.

The optical system of the present invention may satisfy the following conditional expression (6)

$$-4.00 < (1-\beta 3B) \times \beta 3C < -2.00 \quad (6)$$

where $\beta 3B$ is a lateral magnification of the second partial unit 3B, and $\beta 3C$ is a lateral magnification of the third partial unit 3C.

The conditional expression (6) is for properly setting a combination of the lateral magnification of the second partial unit 3B, which is an image-stabilizing optical system, and the lateral magnification of the third partial unit 3C disposed on the image side of the second partial unit 3B. If the value is higher than the upper limit of the conditional expression (6), a moving amount of the second partial unit 3B may increase during the image stabilization and a diameter of the optical system may increase. On the other hand, if the value is lower than the lower limit of the conditional expression (6), a variation in aberration may increase during the image stabilization. If the value is lower than the lower limit of the conditional expression (6), the sensitivity in the image stabilization is so large that image blur occurs when the image-stabilizing optical system moves due to a matter other than the image stabilization.

Numerical ranges of the conditional expressions (1) to (6) may be set to those in the following conditional expressions (1a) to (6a), respectively.

$$-0.260 < \beta 3/f < -0.075 \tag{1a}$$

$$0.0125 < D3A/f < 0.0375 \tag{2a}$$

$$-0.200 < \beta 3B/f < -0.055 \tag{3a}$$

$$0.43 < L/f < 0.65 \tag{4a}$$

$$-1.15 < \beta 3A/f < -0.30 \tag{5a}$$

$$-3.50 < (1-\beta 3B) \times \beta 3C < -2.20 \tag{6a}$$

The numerical ranges of the conditional expressions (1) to (6) may be set to those in the following conditional expressions (1b) to (6b), respectively.

$$-0.20 < \beta 3/f < -0.10 \tag{1b}$$

$$0.015 < D3A/f < 0.025 \tag{2b}$$

$$-0.15 < \beta 3B/f < -0.05 \tag{3b}$$

$$0.46 < L/f < 0.60 \tag{4b}$$

$$-1.10 < \beta 3A/f < -0.40 \tag{5b}$$

$$-3.00 < (1-\beta 3B) \times \beta 3C < -2.40 \tag{6b}$$

Further conditions will be described for the optical system of the present invention. First, the following conditional expression may be satisfied:

$$4.50 \le fDOE/f \le 30.00 \tag{7}$$

where fDOE is a focal length of a diffractive surface D of a diffractive optical element included in the first lens unit L1.

The conditional expression (7) relates to a refractive power of the diffractive surface D of the diffractive optical element, and represents a condition for obtaining the fine optical performance. By considering a spectral curve given by the diffractive surface, a phase shape ψ of the diffractive surface D can be expressed using the following polynomial:

$$\psi(h,m) = \{2\pi m/(\lambda_0)\}(C2h^2 + C4h^4 + C6h^6 + C8h^8 + C10h^{10} \ldots)$$

where h is height from the optical axis in a direction orthogonal to the optical axis, m is diffraction order for a diffracted light, $\lambda_0$ is a reference wavelength, and Ci is a phase coefficient (i=2, 4, 6, 8, 10 . . . ).

At this time, the following expression can express a refractive power φ of the diffractive surface for light having diffraction order m=1 at the reference wavelength $\lambda_0$:

$$\varphi = -2C2$$

where C2 is a phase coefficient. As the reference wavelength, for example, d-line can be used.

The following expression can express a focal length of the diffractive surface:

$$fDOE = -1/(2 \times C2)$$

Since the material of the diffractive optical element has a negative Abbe number (vd=−3.453), giving a positive refractive power to the diffractive surface can correct the on-axis chromatic aberration and the lateral chromatic aberration generated in the first lens unit L1. Further, since the diffractive surface has a positive refractive power, the positive refractive power can be shared between the diffractive surface and the first lens unit L1. Thus, it is possible to correct the spherical aberration and the coma. From this, an aspherical effect is obtained by changing a periodic structure of the diffractive optical element, and the first lens unit L1 can include the minimum number of positive lenses, making it possible to reduce the weight of the first lens unit L1 and the optical system.

If the refractive power of the diffractive surface is so small that the value of fDOE/f is higher than the upper limit of the conditional expression (7), it may not be possible to satisfactorily correct the on-axis chromatic aberration and the lateral chromatic aberration. On the other hand, if the refractive power of the diffractive surface is so large that the value of fDOE/f is lower than the lower limit of the conditional expression (7), the longitudinal chromatic aberration and the lateral chromatic aberration may be overcorrected, and thus a color spherical aberration may be largely generated.

Numerical range of the conditional expression (7) may be as follows.

$$5.50 \le fDOE/f \le 28.00 \tag{7a}$$

The numerical range of the conditional expression (7) may be as follows.

$$6.50 \le fDOE/f \le 26.00 \tag{7b}$$

At least one of the following conditional expressions may be satisfied:

$$0.20 \le f1/f \le 1.60 \tag{8}$$

$$0.10 \le f2/f \le 0.72 \tag{9}$$

where f1 is a focal length of the first lens unit, and f2 is a focal length of the second lens unit.

The conditional expression (8) relates to the refractive power of the first lens unit L1 (a reciprocal of the focal length), and represents a condition for reducing the size of the optical system while ensuring the optical performance. If the refractive power of the first lens unit L1 is so small that the value of f1/f is higher than the upper limit of the conditional expression (8), the effect of the telephoto type refractive power arrangement may decrease, making it difficult to reduce the size of the optical system. If the refractive power of the first lens unit L1 is so large that the value of f1/f is lower than the lower limit of the conditional expression (8), the first lens unit L1 may largely generate the spherical aberration, coma, on-axis chromatic aberration, and lateral chromatic aberration, making it difficult to ensure the high optical performance while the first lens unit L1 includes the minimum number of lenses in a configuration using the diffractive optical element.

The conditional expression (9) relates to the refractive power of the second lens unit L2, and represents a condition for reducing the size of the optical system while ensuring the optical performance. If the refractive power of the second lens unit L2 is so large that the value of f2/f is lower than the lower limit of the conditional expression (9), the aberration generated in the second lens unit L2 may increase, and thus the variation in the optical performance may increase during focusing, making it difficult to ensure the high optical performance. If the refractive power of the second lens unit L2 is so small that the value of f2/f is higher than the upper limit of the conditional expression (9), the moving amount of the second lens unit L2 may be so large during focusing that the size of the optical system may be large.

Numerical range of the conditional expression (8) may be as follows.

$$0.25 \le f1/f \le 1.40 \tag{8a}$$

The numerical range of the conditional expression (8) may be as follows.

$$0.30 \le f1/f \le 1.20 \tag{8b}$$

Numerical range of the conditional expression (9) may be as follows.

$$0.12 \le f2/f \le 0.70 \tag{9a}$$

The numerical range of the conditional expression (9) may be as follows.

$$0.14 \le f2/f \le 0.65 \tag{9b}$$

In each example, the first lens unit L1 includes, in order from the object side to the image side, a 1a-th lens unit (first partial unit) having a positive refractive power including a diffractive optical element, and a 1b-th lens unit (second partial unit) having a negative refractive power disposed with a distance from the 1a-th lens unit. It is possible to reduce a lens diameter on the image side of the first lens unit L1 and the weight of the optical system when the 1a-th lens unit having a positive refractive power is disposed on the object side of the first lens unit L1. The chromatic aberration can be greatly reduced by including the diffractive optical element in the 1a-th lens unit where the paraxial marginal ray and a paraxial chief ray pass at the highest height from the optical axis in the optical system. The diffractive optical element generates the color spherical aberration at high dispersion. However, by disposing the 1b-th lens unit having the negative refractive power on the image side of the first lens unit L1, the diffractive surface and the negative 1b-th lens unit can correct the spherical aberration generated in the positive 1a-th lens unit, making it possible to ensure the fine optical performance.

At least one of the following conditional expressions may be satisfied:

$$0.09 \le f1a/f1 \le 1.20 \tag{10}$$

$$-1.60 \le f2b/f1 \le -0.03 \tag{11}$$

where f1a is a focal length of the 1a-th lens unit and f1b is a focal length of the 1b-th lens unit.

The conditional expression (10) relates to a refractive power of the 1a-th lens unit, and represents a condition for reducing the size of the optical system while ensuring the optical performance. If the refractive power of the 1a-th lens unit is so small that the value of f1a/f1 is higher than the upper limit of the conditional expression (10), a lens diameter on the image side lens unit may be larger than that of the first lens unit L1, making it impossible to reduce the size of the imaging optical system. The first lens unit L1 has a telephoto type refractive power arrangement including the 1a-th lens unit having the positive refractive power and the 1b-th lens unit having the negative refractive power. However, if the refractive power of the 1a-th lens unit is small, it may be impossible to reduce an overall length of the first lens unit L1. If the refractive power of the first lens unit L1 is so large that the value of f1a/f1 is lower than the lower limit of the conditional expression (10), the 1a-th lens unit increases the generation of the spherical aberration, coma, longitudinal chromatic aberration, and lateral chromatic aberration. Thus, it may be difficult to ensure the high optical performance while the first lens unit L1 includes the minimum number of lenses in the configuration using the diffractive optical element.

The conditional expression (11) relates to a refractive power of the 1b-th lens unit, and represents a condition for reducing the size the optical system while ensuring the optical performance. As described above, the first lens unit L1 has the telephoto type refractive power arrangement. However, if the refractive power of the 1b-th lens unit is so small that the value of f2b/f1 is higher than the upper limit of the conditional expression (11), the above described effect of the telephoto type refractive power arrangement of the first lens unit L1 may decrease, making it impossible to reduce the overall length of the first lens unit L1. If the refractive power of the first lens unit L1 is so large that the value of f2b/f1 is lower than the lower limit of the conditional expression (11), it may be difficult to correct the spherical aberration, coma, on-axis chromatic aberration, and lateral chromatic aberration generated in the 1a-th lens unit.

Numerical range of the conditional expression (10) may be as follows.

$$0.12 \le f1a/f1 \le 1.00 \tag{10a}$$

The numerical range of the conditional expression (10) may be as follows.

$$0.15 \le f1a/f1 \le 0.90 \tag{10b}$$

Numerical range of the conditional expression (11) may be as follows.

$$-1.50 \le f2b/f1 \le -0.05 \tag{11a}$$

The numerical range of the conditional expression (11) may be as follows.

$$-1.20 \le f2b/f1 \le -0.06 \tag{11b}$$

The second lens unit L2 may include a single lens having a positive refractive power. This may reduce the weight of the second lens unit L2 that moves during focusing.

The following conditional expression may be satisfied:

$$\rho Gp \le 3.00 \text{ [g/cm}^3\text{]} \tag{12}$$

where ρGp is a specific gravity of a material of all the positive lenses Gp included in at least one of the first lens unit L1 and the second lens unit L2.

The conditional expression (12) specifies the specific gravity ρGp of the material of the positive lens Gp. If the specific gravity ρGp of the material of the positive lens Gp is larger than the upper limit of the conditional expression (12), the weight of the positive lens Gp may increase, making it difficult to reduce the weight of the optical system.

Numerical range of the conditional expression (12) may be as follows.

$$\rho Gp \le 2.90 \text{ [g/cm}^3\text{]} \tag{12a}$$

The numerical range of the conditional expression (12) may be as follows.

$$\rho Gp \le 2.80 \text{ [g/cm}^3\text{]} \tag{12b}$$

In each of Examples 1, 2 and 4, in order to further reduce the number of lenses, the diffractive optical element is disposed on a positive lens unit of the most object side where the paraxial marginal ray and the paraxial chief ray pass at the highest height from the optical axis in the optical system. Thus, it is possible to greatly reduce the chromatic aberration with a small number of lenses. Since the diffractive optical element has a negative Abbe number (vd=−3.453), it is possible to correct the on-axis chromatic aberration and the lateral chromatic aberration generated in the first lens unit L1 when the diffractive surface has a positive refractive power. Having the positive refractive power, the diffractive surface can share the positive refractive power in the first lens unit L1, and can correct the spherical aberration and coma. At the same time, by using an aspherical effect caused by changing the periodic structure of the diffractive optical element, the positive lens of the first lens unit L1 can include the minimum number of lenses, making it possible to reduce the weight of the optical system.

In each of Examples 5 to 11, the optical system includes 11 or less lenses. Each example reduces the weight of the optical system by reducing the number of lenses constituting each of the first lens unit L1 and the second lens unit L2 that have large diameters, while making the third lens unit L3 having a small diameter correct the aberration generated in the first and second lens units L1 and L2. In this case, the aberration is corrected better as the number of lenses in the third lens unit L3 increases. However, if the total number of lenses is 12 or more, it is impossible to reduce the weight of the optical system. Thus, 11 or less lenses may be used.

A description will now be given of the configuration of each lens unit. In each of Examples 1 and 4, a first lens unit L1 is includes, in order from an object side to an image side, a cemented lens including a biconvex lens and a negative meniscus lens having a concave surface on the object side, and a negative meniscus lens having a concave surface on the object side. The cemented lens has a diffractive surface on a cemented surface. The above described method is used for reducing a variation in optical performance caused by longitudinal chromatic aberration, lateral chromatic aberration, and focusing. In Example 2, a first lens unit L1 includes, in order from an object side to an image side, a positive meniscus lens having a convex surface on the object side, a cemented lens of a biconvex lens and a biconcave lens, and a negative meniscus lens having a concave surface on the object side. The cemented lens has a diffractive surface on a cemented surface. In Example 3, a first lens unit L1 includes, in order from an object side to an image side, a positive meniscus lens having a convex surface on the object side, a biconvex lens, a positive meniscus lens having a convex surface on the object side, and a biconcave lens.

In Example 1, a second lens unit L2 includes only a single biconvex lens. In Examples 2 to 4, a second lens unit L2 includes only a single positive meniscus lens having a convex surface on the object side. By using a second lens unit L2 having a single positive lens, it is possible to reduce lens weight and thus high-speed focusing can be realized. In each example, the second lens unit L2 has a single lens to reduce the lens weight and to improve the focusing speed. However, it is possible to configure the second lens unit L2 using a plurality of lenses to improve performance of the optical system.

In each of Examples 1, 2 and 4, a third lens unit L3 includes a first partial unit 3A includes a cemented lens of a biconcave lens and a biconvex lens, a second partial unit 3B composed of a biconcave lens and a cemented lens of a biconvex lens and a biconcave lens, and a third partial unit 3C composed of a biconvex lens. In Example 3, a third lens unit L3 includes a first partial unit 3A composed of a cemented lens of a biconcave lens and a biconvex lens, a second partial unit 3B composed of a biconcave lens and a cemented lens of a biconvex lens and a biconcave lens, and a third partial unit 3C composed of a positive meniscus lens having a convex surface on the image side.

In each of Examples 1 to 4, the second partial unit 3B performs image stabilization by moving in a direction orthogonal to the optical axis. In each of Examples 1 to 4, the second partial unit 3B includes three units. The second partial unit 3B may include two or more units in order to suppress a variation in chromatic aberration during the image stabilization.

In each of Examples 5 to 11, a 1a-th lens unit in a first lens unit L1 includes a diffractive optical element DOE having a diffractive surface D. Each of Examples 5, 7, 8, and 10 provides the diffractive optical element DOE on a lens closest to the object in the 1a-th lens unit L1a, and each of Examples 6, 9, and 11 provides the diffractive optical element DOE on a second lens from the object side in the 1a-th lens unit L1a.

In each of Examples 5 and 7, the first lens unit L1 includes three lenses. In each of Examples 6, 8, 9, and 11, the first lens unit L1 includes four lenses. In Example 10, the first lens unit L1 includes two lenses. In each of Examples 5 to 11, the 1b-th lens unit L1b includes a single negative lens. As described above, in each of Examples 5 to 11, the first lens unit L1 includes four or less lenses.

In each of Examples 5 and 7, the entire system includes ten lenses, and in each of Examples 6, 8, 9, and 11, the entire system includes eleven lenses. In Example 10, the entire system includes eight lenses. As described above, in Examples 5 to 11, the entire system includes 11 or less lenses.

The following gives numerical examples 1 to 11 respectively corresponding to Examples 1 to 11. In surface data of each numerical example, r represents a curvature radius of each optical surface, and d (mm) represents an on-axis distance (distance on the optical axis) between an m-th surface and an (m+1)-th surface. Here, m is an order of a surface counted from a light incident side. nd represents a refractive index of each optical member with respect to the d-line, and vd represents an Abbe number of the optical member. The Abbe number vd of a certain material is expressed by the following expression:

$$\nu d=(Nd-1)/(NF-NC)$$

where Nd, NF, and NC are the refractive indexes at the Fraunhofer d-line (587.6 nm), F-line (486.1 nm), C-line (656.3 nm), and g-line (435.8 nm).

In each numerical example, d, focal length (mm), F-number, and half angle of view (degree) are all values when the optical system according to each example focuses on an object at infinity. The back focus (BF) represents a distance on the optical axis from a last lens surface (lens surface closest to the image side) to an image plane (paraxial image plane) expressed as air converted length. The "overall lens length" is a length obtained by adding the back focus to a distance on the optical axis from a front lens surface (lens surface closest to the object side) to the last lens surface of the optical system. The "lens unit" is not limited to a lens unit consisting of a plurality of lenses, but also a lens unit consisting of a single lens.

A phase shape ψ of diffraction grating can be expressed by the following expression:

$$\psi(h,m)=(2\pi/m\lambda_0))\times(C1\cdot h^2+C2\cdot h^4+C3\cdot h^6+\ldots)$$

where m is diffraction order of a diffracted light, $\lambda_0$ is a design wavelength, h is height from the optical axis in a direction orthogonal to the optical axis, and Ci (i=1, 2, 3 . . . ) is a phase coefficient.

When the optical surface is an aspherical surface, (diffraction) is displayed on the right side of the surface number.

The aspherical shape is expressed by the following expression:

$$x=(h^2/R)/[1+\{1-(1+k)(h/R)^2\}^{1/2}+A4\times h^4+A6\times h^6+A8\times h^8+A10\times h^{10}]$$

where X is a displacement amount from a surface vertex in the optical axis direction, h is height from the optical axis in a direction orthogonal to the optical axis, R is a paraxial curvature radius, k is a conic constant, A4, A6, A8 and A10 are aspherical coefficients of each order. "e±XX" in each aspheric coefficient represents "$\times 10^{\pm XX}$".

Table 1 summarizes the values corresponding to the conditional expressions (1) to (6) described above in the numerical examples 1 to 4. Table 2 summarizes the values corresponding to the conditional expressions (1) and (7) to (11) described above in the numerical examples 5 to 11. The numerical values of the conditional expression (12) in Table 2 represents the maximum value among the specific gravity ρGp of the materials of all the positive lenses Gp of the first lens unit L1 and the second lens unit L2.

Numerical Example 1

| UNIT mm | | | | |
|---|---|---|---|---|
| Surface data | | | | |
| Surface data | r | d | nd | vd |
| 1 | 58.978 | 11.86 | 1.48749 | 70.2 |
| 2(diffraction) | −205.536 | 2.70 | 1.91082 | 35.3 |
| 3 | −776.181 | 61.26 | | |
| 4 | −46.263 | 1.30 | 1.83481 | 42.7 |
| 5 | −112.060 | (variable) | | |
| 6 | 120.340 | 2.08 | 1.48749 | 70.2 |
| 7 | −488.018 | (variable) | | |
| 8(diaphragm) | ∞ | 6.43 | | |
| 9 | −43.031 | 1.00 | 1.90043 | 37.4 |
| 10 | 43.031 | 3.82 | 1.65412 | 39.7 |
| 11 | −29.498 | 12.32 | | |
| 12 | 107.096 | 3.70 | 1.65412 | 39.7 |
| 13 | −22.333 | 0.80 | 1.59282 | 68.6 |
| 14 | 293.053 | 0.63 | | |
| 15 | −76.788 | 0.80 | 1.80400 | 46.5 |
| 16 | 54.248 | 1.33 | | |
| 17 | 63.147 | 2.07 | 1.59551 | 39.2 |
| 18 | −767.459 | 138.29 | | |
| image plane | ∞ | | | |

ASPHERIC DATA

Second surface (diffractive surface)

A 2 = −4.47403e−005  A 4 = 1.03980e−008  A 6 = −5.47538e−012  A 8 = 2.97170e−015
A 10 = −1.66936e−018

| VARIOUS DATA | |
|---|---|
| zoom ratio 1.00 | |
| Focal length | 582.00 |
| F-NUMBER | 11.31 |
| Half angle of view (degree) | 2.13 |
| Image height | 21.64 |
| Overall lens length | 287.05 |
| BF | 138.29 |

| | state focusing on object at infinity | state focusing on object at a distance of 4.5 m |
|---|---|---|
| d 5 | 17.42 | 2.51 |
| d 7 | 19.23 | 34.14 |

| LENS UNIT DATA | | |
|---|---|---|
| Unit | Starting surface | Focal length |
| 1 | 1 | 386.12 |
| 2 | 6 | 198.25 |
| 3 | 8 | −86.66 |
| 3A | 8 | −342.02 |
| 3B | 12 | −55.81 |
| 3C | 17 | 98.07 |

Numerical Example 2

| | UNIT mm | | | |
|---|---|---|---|---|
| | Surface data | | | |
| Surface data | r | d | nd | vd |
| 1 | 81.395 | 9.89 | 1.48749 | 70.2 |
| 2 | 767.797 | 30.35 | | |
| 3 | 83.964 | 9.43 | 1.48749 | 70.2 |
| 4(diffraction) | −277.706 | 2.70 | 1.80400 | 46.5 |
| 5 | 113.168 | 85.76 | | |
| 6 | −49.232 | 1.30 | 1.74400 | 44.8 |
| 7 | −95.332 | (variable) | | 0 |
| 8 | 67.893 | 2.25 | 1.51633 | 64.1 |
| 9 | 448.372 | (variable) | | |
| 10(diaphragm) | ∞ | 6.43 | | |
| 11 | −43.031 | 1.00 | 1.90043 | 37.4 |
| 12 | 43.031 | 3.82 | 1.65412 | 39.7 |
| 13 | −29.498 | 12.32 | | |
| 14 | 107.096 | 3.70 | 1.65412 | 39.7 |
| 15 | −22.333 | 0.80 | 1.59282 | 68.6 |
| 16 | 293.053 | 0.63 | | |
| 17 | −76.788 | 0.80 | 1.80400 | 46.5 |
| 18 | 54.248 | 1.33 | | |
| 19 | 63.147 | 2.07 | 1.59551 | 39.2 |
| 20 | −767.459 | 138.10 | | |
| image plane | ∞ | | | |

ASPHERIC DATA

Fourth surface (diffractive surface)

$A2 = -4.52286e-005$ $A4 = 6.40571e-009$ $A6 = -8.87101e-013$ $A8 = -7.49305e-016$
$A10 = 5.24559e-019$

VARIOUS DATA
zoom ratio 1.00

| Focal length | 775.99 |
|---|---|
| F-NUMBER | 11.31 |
| Half angle of view (degree) | 1.60 |
| Image height | 21.64 |
| Overall lens length | 365.39 |
| BF | 138.10 |

| | state focusing on object at infinity | state focusing on object at a distance of 6 m |
|---|---|---|
| d 7 | 32.49 | 16.04 |
| d 9 | 20.22 | 36.67 |

LENS UNIT DATA

| Unit | Starting surface | Focal length |
|---|---|---|
| 1 | 1 | 686.23 |
| 2 | 8 | 154.64 |
| 3 | 10 | −86.66 |
| 3A | 10 | −342.02 |
| 3B | 14 | −55.81 |
| 3C | 19 | 98.07 |

Numerical Example 3

| | UNIT mm | | | |
|---|---|---|---|---|
| | Surface data | | | |
| Surface data | r | d | nd | vd |
| 1 | 133.448 | 4.39 | 1.59349 | 67.0 |
| 2 | 245.324 | 9.88 | | |
| 3 | 54.814 | 10.00 | 1.43875 | 94.7 |

-continued

| | UNIT mm | | | |
|---|---|---|---|---|
| 4 | −294.426 | 8.61 | | |
| 5 | 59.825 | 5.12 | 1.43875 | 94.7 |
| 6 | 631.348 | 1.04 | | |
| 7 | −254.244 | 1.30 | 1.74100 | 52.6 |
| 8 | 50.472 | (variable) | | |
| 9 | 64.215 | 1.81 | 1.49700 | 81.5 |
| 10 | 103.624 | (variable) | | |
| 11 (diaphragm) | ∞ | 5.00 | | |
| 12 | −63.723 | 1.00 | 1.91082 | 35.3 |

-continued

| UNIT mm | | | | |
|---|---|---|---|---|
| 13 | 87.812 | 3.00 | 1.73800 | 32.3 |
| 14 | −56.968 | 11.15 | | |
| 15 | 115.364 | 3.17 | 1.73800 | 32.3 |
| 16 | −37.330 | 2.45 | 1.49700 | 81.5 |
| 17 | 180.804 | 0.79 | | |
| 18 | −66.872 | 1.38 | 1.91082 | 35.3 |
| 19 | 79.176 | 2.11 | | |
| 20 | −814.769 | 1.89 | 1.48749 | 70.2 |
| 21 | −67.269 | 178.41 | | |
| image plane | ∞ | | | |

VARIOUS DATA
zoom ratio 1.00

| Focal length | 582.00 |
|---|---|
| F-NUMBER | 11.31 |
| Half angle of view (degree) | 2.13 |
| Image height | 21.64 |
| Overall lens length | 328.50 |
| BF | 178.41 |

-continued

| UNIT mm | | |
|---|---|---|
| | state focusing on object at infinity | state focusing on object at a distance of 4.5 m |
| d 8 | 73.90 | 55.33 |
| d 10 | 2.10 | 20.67 |

LENS UNIT DATA

| Unit | Starting surface | Focal length |
|---|---|---|
| 1 | 1 | 255.94 |
| 2 | 9 | 334.63 |
| 3 | 11 | −92.66 |
| 3A | 11 | −349.57 |
| 3B | 15 | −71.37 |
| 3C | 20 | 150.28 |

Numerical Example 4

UNIT mm

Surface data

| Surface data | r | d | nd | vd |
|---|---|---|---|---|
| 1 | 87.387 | 12.85 | 1.48749 | 70.2 |
| 2(diffraction) | −334.980 | 3.00 | 1.83400 | 37.2 |
| 3 | −2900.216 | 93.84 | | |
| 4 | −68.593 | 1.30 | 1.80100 | 35.0 |
| 5 | −132.015 | (variable) | | |
| 6 | 89.303 | 3.07 | 1.48749 | 70.2 |
| 7 | 417.857 | (variable) | | |
| 8(diaphragm) | ∞ | 4.99 | | |
| 9 | −91.716 | 0.99 | 1.90043 | 37.4 |
| 10 | 30.296 | 4.42 | 1.65412 | 39.7 |
| 11 | −42.133 | 9.99 | | |
| 12 | 63.149 | 4.36 | 1.65412 | 39.7 |
| 13 | −22.130 | 1.75 | 1.59282 | 68.6 |
| 14 | 65.686 | 1.09 | | |
| 15 | −76.612 | 0.70 | 1.80400 | 46.5 |
| 16 | 42.003 | 3.01 | | |
| 17 | 42.568 | 3.31 | 1.51742 | 52.4 |
| 18 | −273.996 | 105.35 | | |
| image plane | ∞ | | | |

ASPHERIC DATA

Second surface (diffractive surface)

A 2 = −3.30742e−005 A 4 = 3.39180e−009 A 6 = −3.87395e−013 A 8 = −4.34279e−016
A 10 = 1.36105e−019

VARIOUS DATA
zoom ratio 1.00

| Focal length | 582.00 |
|---|---|
| F-NUMBER | 8.20 |
| Half angle of view (degree) | 2.13 |
| Image height | 21.64 |
| Overall lens length | 314.65 |
| BF | 105.35 |

| | state focusing on object at infinity | state focusing on object at a distance of 4.5 m |
|---|---|---|
| d 5 | 21.82 | 2.50 |
| d 7 | 38.83 | 58.15 |

-continued

| UNIT mm | | |
|---|---|---|
| LENS UNIT DATA | | |
| Unit | Starting surface | Focal length |
| 1 | 1 | 448.61 |
| 2 | 6 | 232.27 |
| 3 | 8 | −84.76 |
| 3A | 8 | −610.16 |
| 3B | 12 | −41.84 |
| 3C | 17 | 71.46 |

Numerical Example 5

| UNIT mm | | | | |
|---|---|---|---|---|
| Surface data | | | | |
| Surface number | r | d | nd | vd | specific gravity |
| 1 | 56.252 | 12.20 | 1.48749 | 70.2 | 2.46 |
| 2(diffraction) | −180.408 | 2.77 | 1.59551 | 39.2 | |
| 3 | 785.004 | 59.15 | | | |
| 4 | −42.901 | 1.30 | 1.83481 | 42.7 | |
| 5 | −92.466 | (variable) | | | |
| 6 | 98.007 | 2.09 | 1.48749 | 70.2 | 2.46 |
| 7 | ∞ | (variable) | | | |
| 8(diaphragm) | ∞ | 6.44 | | | |
| 9 | −42.741 | 1.00 | 1.90043 | 37.4 | |
| 10 | 42.741 | 3.85 | 1.65412 | 39.7 | |
| 11 | −29.300 | 12.20 | | | |
| 12 | 107.876 | 3.70 | 1.65412 | 39.7 | |
| 13 | −22.269 | 0.80 | 1.59282 | 68.6 | |
| 14 | 300.803 | 0.64 | | | |
| 15 | −75.518 | 0.80 | 1.80400 | 46.5 | |
| 16 | 54.756 | 1.33 | | | |
| 17 | 63.816 | 2.10 | 1.59551 | 39.2 | |
| 18 | −675.205 | 138.06 | | | |
| image plane | ∞ | | | | |

| variable distance data | | |
|---|---|---|
| surface number | state focusing on object at infinity | state focusing on close object |
| 5 | 16.25 | 3.50 |
| 7 | 22.19 | 34.94 |

ASPHERIC DATA

Second surface (diffractive surface)

$C_2 = -4.69717e-005$  $C_4 = 1.13471e-008$  $C_6 = -2.69625e-012$  $C_8 = -4.35136e-015$
$C_{10} = 2.95662e-018$

| VARIOUS DATA | |
|---|---|
| Focal length | 581.65 |
| F-NUMBER | 11.31 |
| Half angle of view (degree) | 2.13 |
| Image height | 21.64 |
| Overall lens length | 286.87 |
| BF | 138.06 |
| position of entrance pupil | 399.66 |
| position of exit pupil | −24.31 |
| position of front principal point | −1102.24 |
| position of rear principal point | −443.59 |

-continued

| | UNIT mm | |
|---|---|---|
| | LENS UNIT DATA | |
| L | Starting surface | Focal length |
| L1 | 1 | 384.29 |
| L1a | 1 | 133.27 |
| L1b | 4 | −97.03 |
| L2 | 6 | 201.04 |
| L3 | 8 | −86.51 |

Numerical Example 6

| UNIT mm | | | | | |
|---|---|---|---|---|---|
| Surface data | | | | | |
| Surface number | r | d | nd | vd | specific gravity |
| 1 | 82.842 | 9.45 | 1.48749 | 70.2 | 2.46 |
| 2 | 780.100 | 40.42 | | | |
| 3 | 81.828 | 9.23 | 1.48749 | 70.2 | 2.46 |
| 4(diffraction) | −194.436 | 2.76 | 1.74400 | 44.8 | |
| 5 | 105.769 | 70.95 | | | |
| 6 | −53.038 | 1.35 | 1.69680 | 55.5 | |
| 7 | −106.842 | (variable) | | | |
| 8 | 69.898 | 2.40 | 1.48749 | 70.2 | 2.46 |
| 9 | 455.147 | (variable) | | | |
| 10(diaphragm) | ∞ | 6.44 | | | |
| 11 | −42.741 | 1.00 | 1.90043 | 37.4 | |
| 12 | 42.741 | 3.85 | 1.65412 | 39.7 | |
| 13 | −29.300 | 12.20 | | | |
| 14 | 107.876 | 3.70 | 1.65412 | 39.7 | |
| 15 | −22.269 | 0.80 | 1.59282 | 68.6 | |
| 16 | 300.803 | 0.64 | | | |
| 17 | −75.518 | 0.80 | 1.80400 | 46.5 | |
| 18 | 54.756 | 1.33 | | | |
| 19 | 63.816 | 2.10 | 1.59551 | 39.2 | |
| 20 | −675.205 | 138.30 | | | |
| image plane | ∞ | | | | |

| variable distance data | | |
|---|---|---|
| surface number | state focusing on object at infinity | state focusing on close object |
| 7 | 35.90 | 21.25 |
| 9 | 21.43 | 36.08 |

ASPHERIC DATA

Fourth surface (diffractive surface)

$C_2 = -5.38010e-005$ $C_4 = 6.66877e-009$ $C_6 = -3.04640e-013$ $C_8 = -3.57268e-015$
$C_{10} = 2.50469e-018$

| VARIOUS DATA | |
|---|---|
| Focal length | 776.37 |
| F-NUMBER | 11.31 |
| Half angle of view (degree) | 1.60 |
| Image height | 21.64 |
| Overall lens length | 365.06 |
| BF | 138.30 |
| position of entrance pupil | 951.06 |
| position of exit pupil | −24.31 |
| position of front principal point | −1979.36 |
| position of rear principal point | −638.08 |

-continued

| UNIT mm | | |
|---|---|---|
| LENS UNIT DATA | | |
| L | Starting surface | Focal length |
| L1 | 1 | 600.53 |
| L1a | 1 | 239.98 |
| L1b | 6 | −152.73 |
| L2 | 8 | 169.05 |
| L3 | 10 | −86.51 |

Numerical Example 7

| UNIT mm | | | | | |
|---|---|---|---|---|---|
| Surface data | | | | | |
| Surface number | r | d | nd | vd | specific gravity |
| 1 | 47.109 | 11.13 | 1.48749 | 70.2 | 2.46 |
| 2(diffraction) | −161.186 | 2.50 | 1.90043 | 37.4 | |
| 3 | −576.342 | 47.21 | | | |
| 4 | −36.445 | 1.19 | 2.05090 | 26.9 | |
| 5 | −82.087 | (variable) | | | |
| 6 | 68.410 | 2.33 | 1.64769 | 33.8 | 2.79 |
| 7 | −231.542 | (variable) | | | |
| 8 (diaphragm) | ∞ | 24.17 | | | |
| 9 | −274.246 | 0.80 | 1.95375 | 32.3 | |
| 10 | 16.747 | 3.62 | 1.58144 | 40.8 | |
| 11 | −21.207 | 1.50 | | | |
| 12 | 31.700 | 2.65 | 1.84666 | 23.9 | |
| 13 | −26.941 | 0.79 | 1.88300 | 40.8 | |
| 14 | 16.874 | 2.44 | | | |
| 15 | −14.125 | 0.51 | 1.77250 | 49.6 | |
| 16 | −31.144 | 0.88 | | | |
| 17 | 36.246 | 2.05 | 1.51742 | 52.4 | |
| 18 | −58.836 | 73.20 | | | |
| image plane | ∞ | | | | |

| variable distance data | | |
|---|---|---|
| surface number | state focusing on object at infinity | state focusing on close object |
| 5 | 8.12 | 2.30 |
| 7 | 4.43 | 10.25 |

ASPHERIC DATA

Second surface (diffractive surface)

$C2 = -5.69880e-005$  $C4 = 2.16776e-008$  $C6 = -4.89942e-012$  $C8 = -1.44578e-014$
$C10 = 9.74023e-018$

| VARIOUS DATA | |
|---|---|
| Focal length | 412.00 |
| F-NUMBER | 8.24 |
| Half angle of view (degree) | 3.01 |
| Image height | 21.64 |
| Overall lens length | 189.54 |
| BF | 73.20 |
| position of entrance pupil | 194.73 |
| position of exit pupil | −22.69 |
| position of front principal point | −1163.39 |
| position of rear principal point | −338.80 |

-continued

| | UNIT mm | |
|---|---|---|
| | LENS UNIT DATA | |
| L | Starting surface | Focal length |
| L1 | 1 | 470.83 |
| L1a | 1 | 105.10 |
| L1b | 4 | −63.22 |
| L2 | 6 | 81.78 |
| L3 | 8 | −37.61 |

Numerical Example 8

| UNIT mm | | | | | |
|---|---|---|---|---|---|
| Surface data | | | | | |
| Surface number | r | d | nd | vd | specific gravity |
| 1 | 58.132 | 11.73 | 1.48749 | 70.2 | 2.46 |
| 2(diffraction) | −183.877 | 2.75 | 1.83481 | 42.7 | |
| 3 | −2442.019 | 27.53 | | | |
| 4 | 385.426 | 3.00 | 1.48749 | 70.2 | 2.46 |
| 5 | −340.328 | 26.95 | | | |
| 6 | −49.614 | 1.30 | 1.88300 | 40.8 | |
| 7 | −162.317 | (variable) | | | |
| 8 | 56.698 | 2.67 | 1.48749 | 70.2 | 2.46 |
| 9 | 875.669 | (variable) | | | |
| 10(diaphragm) | ∞ | 2.54 | | | |
| 11 | −48.041 | 1.00 | 1.95375 | 32.3 | |
| 12 | 30.730 | 4.26 | 1.56732 | 42.8 | |
| 13 | −24.036 | 11.80 | | | |
| 14 | 72.747 | 3.61 | 1.75520 | 27.5 | |
| 15 | −18.920 | 0.78 | 1.59522 | 67.7 | |
| 16 | 77.087 | 1.03 | | | |
| 17 | −39.298 | 0.79 | 1.95375 | 32.3 | |
| 18 | 41.161 | 1.91 | | | |
| 19 | 48.822 | 2.51 | 1.63980 | 34.5 | |
| 20 | −73.664 | 120.88 | | | |
| image plane | ∞ | | | | |

| variable distance data | | |
|---|---|---|
| surface number | state focusing on object at infinity | state focusing on close object |
| 7 | 15.03 | 9.03 |
| 9 | 19.84 | 25.85 |

ASPHERIC DATA

Second surface (diffractive surface)

C 2 = −3.73550e−005 C 4 = 7.81816e−009 C 6 = −1.24575e−012 C 8 = −3.88784e−015
C 10 = 2.19731e−018

| VARIOUS DATA | |
|---|---|
| Focal length | 582.00 |
| F-NUMBER | 11.31 |
| Half angle of view (degree) | 2.13 |
| Image height | 21.64 |
| Overall lens length | 261.90 |
| BF | 120.88 |
| position of entrance pupil | 386.37 |
| position of exit pupil | −21.89 |
| position of front principal point | −1404.10 |
| position of rear principal point | −461.12 |

-continued

| UNIT mm | | |
|---|---|---|
| LENS UNIT DATA | | |
| L | Starting surface | Focal length |
| L1 | 1 | 322.40 |
| L1a | 1 | 111.66 |
| L1b | 6 | −81.36 |
| L2 | 8 | 124.23 |
| L3 | 10 | −48.54 |

Numerical Example 9

| UNIT mm | | | | | |
|---|---|---|---|---|---|
| Surface data | | | | | |
| Surface number | r | d | nd | vd | specific gravity |
| 1 | 77.775 | 9.98 | 1.48749 | 70.2 | 2.46 |
| 2 | 774.937 | 52.13 | | | |
| 3 | 69.150 | 8.02 | 1.48749 | 70.2 | 2.46 |
| 4(diffraction) | −124.624 | 2.76 | 1.76200 | 40.1 | |
| 5 | 118.413 | 38.66 | | | |
| 6 | −59.314 | 1.35 | 1.64769 | 33.8 | |
| 7 | −91.629 | (variable) | | | |
| 8 | 88.027 | 1.89 | 1.48749 | 70.2 | 2.46 |
| 9 | 139.929 | (variable) | | | |
| 10(diaphragm) | ∞ | 1.88 | | | |
| 11 | −35.848 | 0.97 | 1.90043 | 37.4 | |
| 12 | 30.925 | 4.10 | 1.65412 | 39.7 | |
| 13 | −25.007 | 4.60 | | | |
| 14 | 98.931 | 3.78 | 1.65412 | 39.7 | |
| 15 | −17.371 | 0.80 | 1.59282 | 68.6 | |
| 16 | 78.416 | 1.05 | | | |
| 17 | −46.364 | 0.78 | 1.80400 | 46.5 | |
| 18 | 51.873 | 0.92 | | | |
| 19 | 49.190 | 2.54 | 1.59551 | 39.2 | |
| 20 | −67.246 | 160.08 | | | |
| image plane | ∞ | | | | |

| variable distance data | | |
|---|---|---|
| surface number | state focusing on object at infinity | state focusing on close object |
| 7 | 27.95 | 2.00 |
| 9 | 10.31 | 36.25 |

ASPHERIC DATA

Fourth surface (diffractive surface)

$C\,2 = -8.46209e{-}005\ C\,4 = 8.05036e{-}009\ C\,6 = 4.47418e{-}012\ C\,8 = -3.09391e{-}014$
$C\,10 = 2.99779e{-}017$

| VARIOUS DATA | |
|---|---|
| Focal length | 776.05 |
| F-NUMBER | 11.31 |
| Half angle of view (degree) | 1.60 |
| Image height | 21.64 |
| Overall lens length | 334.54 |
| BF | 160.08 |
| position of entrance pupil | 712.36 |
| position of exit pupil | −15.90 |
| position of front principal point | −1934.01 |
| position of rear principal point | −615.98 |

UNIT mm

LENS UNIT DATA

| L | Starting surface | Focal length |
|---|---|---|
| L1 | 1 | 263.99 |
| L1a | 1 | 189.07 |
| L1b | 6 | −264.00 |
| L2 | 8 | 481.10 |
| L3 | 10 | −73.30 |

Numerical Example 10

UNIT mm

Surface data

| Surface number | r | d | nd | vd | specific gravity |
|---|---|---|---|---|---|
| 1 | 84.313 | 7.95 | 1.48749 | 70.2 | 2.46 |
| 2(diffraction) | −525.375 | 53.22 | | | |
| 3 | −81.420 | 1.67 | 2.00100 | 29.1 | |
| 4 | −192.692 | (variable) | | | |
| 5 | 175.326 | 2.34 | 1.48749 | 70.2 | 2.46 |
| 6 | −305.845 | (variable) | | | |
| 7(diaphragm) | ∞ | 1.26 | | | |
| 8 | −114.251 | 1.06 | 1.88300 | 40.8 | |
| 9 | 42.112 | 4.40 | 1.54072 | 47.2 | |
| 10 | −40.104 | 27.32 | | | |
| 11 | −77.775 | 3.07 | 1.61340 | 44.3 | |
| 12 | −17.459 | 0.86 | 1.59522 | 67.7 | |
| 13 | 56.405 | 3.41 | | | |
| 14 | 60.077 | 1.51 | 1.62004 | 36.3 | |
| 15 | 452.064 | 160.81 | | | |
| image plane | ∞ | | | | | variable distance data

| surface number | state focusing on object at infinity | state focusing on close object |
|---|---|---|
| 4 | 15.97 | 3.00 |
| 6 | 35.15 | 48.12 |

ASPHERIC DATA

Second surface (diffractive surface)

C 2 = −3.44607e−005 C 4 = 3.35845e−009 C 6 = 2.47911e−012 C 8 = −6.28763e−015
C 10 = 3.08099e−018

VARIOUS DATA

| | |
|---|---|
| Focal length | 585.00 |
| F-NUMBER | 11.30 |
| Half angle of view (degree) | 2.12 |
| Image height | 21.64 |
| Overall lens length | 320.00 |
| BF | 160.81 |
| position of entrance pupil | 306.60 |
| position of exit pupil | −34.06 |
| position of front principal point | −864.62 |
| position of rear principal point | −424.19 |

LENS UNIT DATA

| L | Starting surface | Focal length |
|---|---|---|
| L1 | 1 | 413.05 |
| L1a | 1 | 148.19 |
| L1b | 3 | −141.92 |

-continued

| UNIT mm | | |
|---|---|---|
| L2 | 5 | 228.97 |
| L3 | 7 | −96.18 |

Numerical Example 11

| UNIT mm | | | | | |
|---|---|---|---|---|---|
| Surface data | | | | | |
| Surface number | r | d | nd | vd | specific gravity |
| 1 | 84.469 | 9.72 | 1.48749 | 70.2 | 2.46 |
| 2 | 758.042 | 41.57 | | | |
| 3 | 82.242 | 9.23 | 1.48749 | 70.2 | 2.46 |
| 4(diffraction) | −199.734 | 2.75 | 1.74400 | 44.8 | |
| 5 | 104.584 | 74.52 | | | |
| 6 | −51.516 | 1.35 | 1.69680 | 55.5 | |
| 7 | −99.349 | (variable) | | | |
| 8 | 72.041 | 2.64 | 1.48749 | 70.2 | 2.46 |
| 9 | −1173.384 | (variable) | | | |
| 10(diaphragm) | ∞ | 2.82 | | | |
| 11 | −43.157 | 1.00 | 1.90043 | 37.4 | |
| 12 | 45.912 | 3.77 | 1.65412 | 39.7 | |
| 13 | −29.920 | 11.53 | | | |
| 14 | 100.023 | 3.78 | 1.65412 | 39.7 | |
| 15 | −23.407 | 0.80 | 1.59282 | 68.6 | |
| 16 | 195.124 | 0.66 | | | |
| 17 | −78.068 | 0.80 | 1.80400 | 46.5 | |
| 18 | 56.712 | 2.50 | | | |
| 19 | 75.308 | 2.54 | 1.59551 | 39.2 | |
| 20 | −462.040 | 150.59 | | | |
| image plane | ∞ | | | | |

| variable distance data | | |
|---|---|---|
| surface number | state focusing on object at infinity | state focusing on close object |
| 7 | 31.57 | 20.19 |
| 9 | 20.65 | 32.03 |

ASPHERIC DATA

Fourth surface (diffractive surface)

C 2 = −5.30685e−005 C 4 = 6.50309e−009 C 6 = 8.51402e−014 C 8 = −4.32035e−015
C 10 = 3.14377e−018

| VARIOUS DATA | |
|---|---|
| Focal length | 776.02 |
| F-NUMBER | 11.31 |
| Half angle of view (degree) | 1.60 |
| Image height | 21.64 |
| Overall lens length | 374.79 |
| BF | 150.59 |
| position of entrance pupil | 895.32 |
| position of exit pupil | −22.62 |
| position of front principal point | −1805.39 |
| position of rear principal point | −625.42 |

| LENS UNIT DATA | | |
|---|---|---|
| L | Starting surface | Focal length |
| L1 | 1 | 659.61 |
| L1a | 1 | 251.57 |
| L1b | 6 | −155.36 |
| L2 | 8 | 139.33 |
| L3 | 10 | −82.02 |

TABLE 1

|  |  | Conditional Expression | | | | | |
|---|---|---|---|---|---|---|---|
|  |  | (1) | (2) | (3) | (4) | (5) | (6) |
| Example | 1 | −0.15 | 0.021 | −0.10 | 0.49 | −0.59 | −2.50 |
|  | 2 | −0.11 | 0.016 | −0.07 | 0.47 | −0.44 | −2.49 |
|  | 3 | −0.16 | 0.019 | −0.12 | 0.56 | −0.60 | −2.50 |
|  | 4 | −0.15 | 0.017 | −0.07 | 0.54 | −1.05 | −2.55 |

TABLE 2

|  |  | Conditional Expression | | | | | | |
|---|---|---|---|---|---|---|---|---|
|  |  | (1) | (7) | (8) | (9) | (10) | (11) | (12) |
| Example | 5 | −0.15 | 18.30 | 0.66 | 0.35 | 0.35 | −0.25 | 2.46 |
|  | 6 | −0.11 | 11.97 | 0.77 | 0.22 | 0.40 | −0.25 | 2.46 |
|  | 7 | −0.09 | 21.30 | 1.14 | 0.20 | 0.22 | −0.13 | 2.79 |
|  | 8 | −0.08 | 23.00 | 0.55 | 0.21 | 0.35 | −0.25 | 2.46 |
|  | 9 | −0.09 | 7.61 | 0.34 | 0.62 | 0.72 | −1.00 | 2.46 |
|  | 10 | −0.16 | 24.80 | 0.71 | 0.39 | 0.36 | −0.34 | 2.46 |
|  | 11 | −0.11 | 12.14 | 0.85 | 0.18 | 0.38 | −0.24 | 2.46 |

Imaging Apparatus

Figure 16:
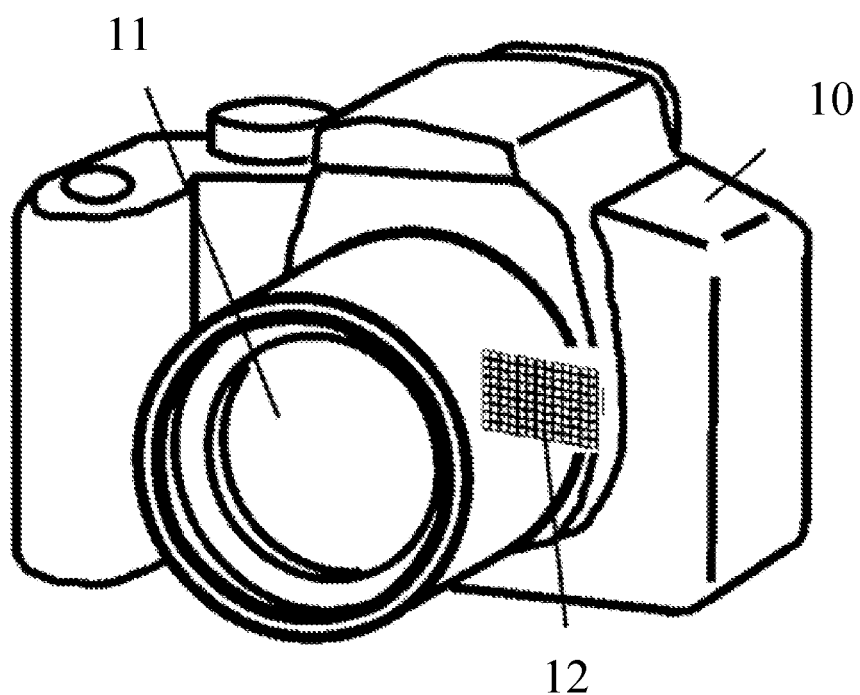
FIG. 16 illustrates a schematic view of main part of an imaging apparatus according to the present invention.

A description will now be given of a digital still camera (imaging apparatus) using the optical system of the present invention as an imaging optical system with reference to FIG. 16. FIG. 16 illustrates a schematic view for a main part of the imaging apparatus in the present invention. In FIG. 16, reference numeral 10 denotes a camera body, and reference numeral 11 denotes an imaging optical system using one of the optical systems according to any of Examples 1 to 11. Reference numeral 12 denotes a solid image sensor (photoelectric conversion element) such as a CCD sensor or a CMOS sensor configured to receive an optical image formed by the imaging optical system 11 and performs a photoelectric conversion. The camera body 10 may be a so-called single-lens reflex camera having a quick turn mirror or may be a so-called mirrorless camera having no quick turn mirror.

By applying the optical system of the present invention to an imaging apparatus such as a digital still camera, the present invention can provide an imaging apparatus having a short overall length and a small lens system while ensuring high focusing performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-093546, filed on May 17, 2019, and 2019-075406, filed on Apr. 11, 2019, which are hereby incorporated by reference herein in its entirety.

What is claimed is:

1. An optical system comprising a plurality of lens units, wherein the plurality of lens units consist of, in order from an object side to an image side:
   a first lens unit having a positive refractive power;
   a second lens unit having a positive refractive power; and
   a third lens unit having a negative refractive power,
   wherein a distance between adjacent lens units changes during focusing,
   wherein the second lens unit moves during the focusing,
   wherein the third lens unit consists of, in order from an object side to an image side, a first partial unit, a second partial unit, and a third partial unit,
   wherein the second partial unit moves in a direction including a component orthogonal to an optical axis during image stabilization, and
   wherein the following conditional expression is satisfied:

$-0.20 < f3/f < -0.05$; and $-4.00 < (1-\beta 3B) \times \beta 3C < -2.00$, where f is a focal length of the optical system focused on an object at infinity and f3 is a focal length of the third lens unit, β3B is a lateral magnification of the second partial unit, and β3C is a lateral magnification of the third partial unit.

2. The optical system according to claim 1, wherein the first partial unit has a negative refractive power, the second partial unit has a negative refractive power, and the third partial unit has a positive refractive power.

3. The optical system according to claim 1, wherein the following conditional expression is satisfied:

$0.01 < D3A/f < 0.05$, where D3A is a distance on the optical axis between the first partial unit and the second partial unit.

4. The optical system according to claim 1, wherein the following conditional expression is satisfied:

$-0.30 < f3B/f < -0.05$, where f3B is a focal length of the second partial unit.

5. The optical system according to claim 1, wherein the following conditional expression is satisfied:

$-1.20 < f3A/f < -0.20$, where f3A is a focal length of the first partial unit.

6. The optical system according to claim 1, wherein the second partial unit consists of at least a single positive lens and at least a single negative lens.

7. The optical system according to claim 1, wherein the following conditional expression is satisfied:

$0.40 < L/f < 0.70$, where L is an overall lens length of the optical system in the state focusing on an object at infinity.

8. The optical system according to claim 1, wherein the first lens unit consists of four or less lenses.

9. The optical system according to claim 1, wherein the first lens unit includes a diffractive optical element.

10. The optical system according to claim 9, wherein the following conditional expression is satisfied:

$4.50 \leq fDOE/f \leq 30.00$, where fDOE is a focal length of a diffractive surface of the diffractive optical element.

11. The optical system according to claim 9, wherein the first lens unit consists of, in order from an object side to an image side, a first subunit having a positive refractive power that includes the diffractive optical element, and a second subunit having a negative refractive power disposed with a distance from the first subunit.

12. The optical system according to claim 11, wherein the diffractive optical element is provided on a lens closest to the object side in the first subunit.

13. The optical system according to claim 11, wherein the diffractive optical element is provided on a second lens from the object side in the first subunit.

14. The optical system according to claim 11, wherein the following conditional expression is satisfied:

$$0.09 \leq f1a/f1 \leq 1.20,$$

where f1a is a focal length of the first subunit.

15. The optical system according to claim 11, wherein the following conditional expression is satisfied:

$$-1.60 \leq f1b/f1 \leq -0.03,$$

wherein f1b is a focal length of the first subunit.

16. The optical system according to claim 1, wherein the following conditional expression is satisfied:

$$0.20 \leq f1/f \leq 1.60,$$

where f1 is a focal length of the first lens unit.

17. The optical system according to claim 1, wherein the following conditional expression is satisfied:

$$0.10 \leq f2/f \leq 0.72,$$

where f2 is a focal length of the second lens unit.

18. The optical system according to claim 1, wherein the following conditional expression is satisfied:

$$\rho Gp \leq 3.00,$$

where ρGp is a maximum specific gravity of every positive lens included in the first lens unit and the second unit.

19. An imaging apparatus comprising:
   the optical system according to claim 1; and
   an image sensor configured to receive an image formed by the optical system.

* * * * *